US011533018B2

(12) United States Patent
Magleby et al.

(10) Patent No.: US 11,533,018 B2
(45) Date of Patent: Dec. 20, 2022

(54) MAINTAINING POSITIONS OF PANELS WITH BIASING MEMBERS AND CABLES

(71) Applicant: Brigham Young University (BYU), Provo, UT (US)

(72) Inventors: Spencer Magleby, Provo, UT (US); Larry Howell, Orem, UT (US); Nathan Pehrson, Provo, UT (US)

(73) Assignee: Brigham Young University (BYU), Provo, UT (US)

( * ) Notice: Subject to any disclaimer, the term of this patent is extended or adjusted under 35 U.S.C. 154(b) by 0 days.

(21) Appl. No.: 17/250,134

(22) PCT Filed: Jun. 6, 2019

(86) PCT No.: PCT/US2019/035776
§ 371 (c)(1),
(2) Date: Dec. 4, 2020

(87) PCT Pub. No.: WO2019/236834
PCT Pub. Date: Dec. 12, 2019

(65) Prior Publication Data
US 2021/0194420 A1    Jun. 24, 2021

Related U.S. Application Data

(60) Provisional application No. 62/681,511, filed on Jun. 6, 2018.

(51) Int. Cl.
*H02S 30/20* (2014.01)
(52) U.S. Cl.
CPC .................................... *H02S 30/20* (2014.12)
(58) Field of Classification Search
CPC ......... H02S 30/20; B64G 1/433; B64G 1/222; B64G 1/443; F24S 23/77; F24S 25/50; F24S 20/50; F24S 2030/16; F41H 5/08
(Continued)

(56) References Cited

U.S. PATENT DOCUMENTS 1,110,084 A * 9/1914 Szalkay .................... F41H 5/08
160/219
2,921,317 A * 1/1960 Tifft ........................ F41H 5/08
2/2.5
(Continued)

FOREIGN PATENT DOCUMENTS

CN          107933960 A  *  4/2018  ............. B64G 1/222

OTHER PUBLICATIONS

CN-107933960-A English machine translation (Year: 2018).*
(Continued)

*Primary Examiner* — Andrew J Golden
(74) *Attorney, Agent, or Firm* — Brake Hughes Bellermann LLP

(57) ABSTRACT

An apparatus can include a central member comprising a first side, a second side, and a third side, a first interior panel rotatably attached to the first side, a second interior panel rotatably attached to the second side, a third interior panel rotatably attached to the third side, a first exterior panel rotatably attached to the first interior panel, a second exterior panel rotatably attached to the second interior panel, a third exterior panel rotatably attached to the third interior panel, a first interior biasing member attached to the central member and the first interior panel and biasing the first interior panel to extend away from the central member toward a plane parallel to the central member, and a first interior restraint cable attached to the central member and the first interior panel and restraining the first interior panel from extending along the plane parallel to the central member.

20 Claims, 28 Drawing Sheets

(58) Field of Classification Search
USPC .................................................. 136/245, 292
See application file for complete search history.

(56) References Cited

U.S. PATENT DOCUMENTS

| | | | |
|---|---|---|---|
| 3,525,483 A | 8/1970 | Alstyne | |
| 5,520,747 A | 5/1996 | Marks | |
| 5,527,001 A * | 6/1996 | Stuart | B64G 1/443 244/159.4 |
| 5,833,176 A * | 11/1998 | Rubin | B64G 1/443 244/172.7 |
| 6,017,002 A * | 1/2000 | Burke | B64G 1/443 136/245 |
| 6,284,966 B1 * | 9/2001 | Simburger | B64G 1/443 135/87 |
| 6,284,967 B1 | 9/2001 | Hakan et al. | |
| 7,748,376 B2 | 7/2010 | Bender | |
| 7,806,370 B2 | 10/2010 | Beidleman et al. | |
| 9,512,618 B2 | 12/2016 | Lang et al. | |
| 2015/0075583 A1 * | 3/2015 | Francis | H02S 30/20 136/245 |
| 2015/0140253 A1 * | 5/2015 | Lang | F24S 20/50 428/57 |
| 2017/0063296 A1 * | 3/2017 | Cruijssen | H02S 30/20 |

OTHER PUBLICATIONS

International Search Report and Written Opinion for Application PCT/US2019/035776, dated Sep. 4, 2019, 8 pages.

N. Pehrson et al.: "Folding Approaches for Tensioned Planar Shell Structures", 2018 AIAA Spacecraft Structures Conference, published online Jan. 7, 2018, 18 pages.

* cited by examiner

MAINTAINING POSITIONS OF PANELS WITH BIASING MEMBERS AND CABLES

CROSS-REFERENCE TO RELATED APPLICATION

This application is a U.S.C. § 371 National Phase Entry Application from PCT Application No. PCT/US2019/035576 filed on Jun. 6, 2019, entitled "MAINTAINING POSITIONS OF PANELS WITH BIASING MEMBERS AND CABLES", and designating the U.S., which claims priority to U.S. Provisional Application No. 62/681,511, filed Jun. 6, 2018, titled "Self-Deployable Self-Stiffening and Retractable Space Structure (SDSR) Mechanism," which are incorporated herein by reference in their entireties.

TECHNICAL FIELD

This description relates to planar materials.

BACKGROUND

Planar materials can be used for space applications, such as solar panels, mirrors, or antenna arrays. If the planar materials are completely flat, they can lose their rigidity, and wobble or bend in undesirable directions.

SUMMARY

An apparatus can comprise a central member comprising at least a first side, a second side, and a third side, a first interior panel rotatably attached to the first side, a second interior panel rotatably attached to the second side, a third interior panel rotatably attached to the third side, a first exterior panel rotatably attached to the first interior panel, a second exterior panel rotatably attached to the second interior panel, a third exterior panel rotatably attached to the third interior panel, a first interior biasing member attached to the central member and the first interior panel, the first interior biasing member biasing the first interior panel to extend away from the central member toward a plane parallel to the central member, and a first interior restraint cable attached to the central member and the first interior panel, the first interior restraint cable restraining the first interior panel from extending along the plane parallel to the central member.

A multifold solar panel array can comprise multiple biasing members, multiple restraint cables, and multiple solar panels. Each of the multiple solar panels can be coupled to at least one adjacent solar panel, from the multiple solar panels, by one of the multiple biasing members and one of the multiple restraint cables, a restraining force of the respective restraint cable opposing a biasing force of the respective biasing member.

A method of controlling a shape of a multifold panel array can comprise increasing an angle of inclination between adjacent panels included in the multifold panel array by contracting a reeling cable, and decreasing the angle of inclination between the adjacent panels by expanding the reeling cable.

The details of one or more implementations are set forth in the accompanying drawings and the description below. Other features will be apparent from the description and drawings, and from the claims.

DETAILED DESCRIPTION

Figure 1A:
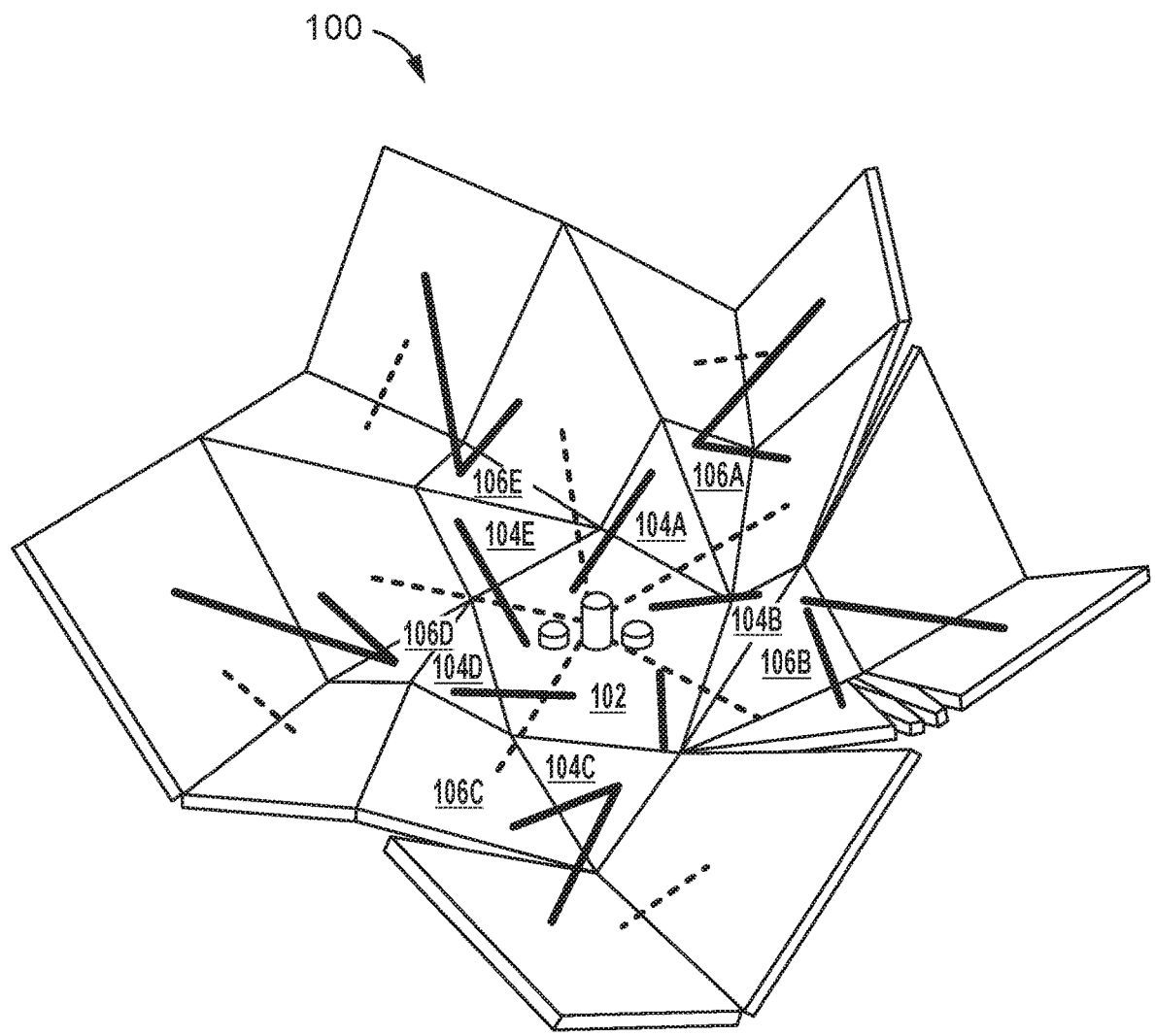
FIG. 1A is a diagram of a multifold panel array in an open position.

An apparatus with multiple panels folded with respect to each other, which can be considered a multifold panel array, can form a self-stiffened array of the panels. The panels can each be rotatably attached to at least one adjacent panel. Stored strain energy of the rotatable attachments can maintain stiffness of the array of panels, preventing the array from wobbling or bending. The panels can be relatively thin, with lengths and/or widths that are ten times or a hundred times a thicknesses of the panels, and/or thicknesses that are one-tenth or one-hundredth the length and/or width of the panel, so the panels can be described in terms of two-dimensional shapes. In some examples, the panels have thicknesses of less than five centimeters, and the panels have lengths of at least one meter. The panels can be polygons, such as triangles, rectangles, parallelograms, pentagons, hexagons, or octagons, as non-limiting examples, and/or can include at least one straight side for rotatably attaching to another panel.

The panels can each be rotatably attached to at least one adjacent member by a biasing member. The biasing member can include a coil or spring, such as a torsion spring. The biasing member can bias the adjacent panels to extend away from each other toward a plane that extends through one of the panels, and/or toward a plane parallel to one of the adjacent panels.

Restraint cables attached to both of the adjacent panels can restrain the panels from extending along adjacent planes. The restraint cables can generate a restraining force that opposes a biasing force generated by the biasing members. The opposition of the restraining force and the biasing force can maintain positions of the adjacent panels with respect to each other, and can store strain energy to maintain the stiffness of the multifold panel array.

The multifold panel array can include one or more reeling cables. The reeling cable(s) can complement the restraining cable at one or more pairs of adjacent panels. The reeling cable(s) can change length, and/or expand or contract. In some examples, a reeling actuator can control the length of the reeling cable. When the reeling cable(s) contracts and/or shortens, a reeling force of the reeling cable can overcome the biasing force, moving the adjacent panels farther away from planes that are adjacent to each other. The reeling cable(s) can fold the multifold panel array into a small size for storage by contracting and/or shortening, and can enable the multifold panel array to self-deploy into an expanded and/or deployed position by lengthening and/or expanding, allowing the biasing members to unfold the adjacent panels. As used herein, "cable," can refer to any tensioning member, such as a cable, rope, cord, ribbon, tie, lanyard, guy wire, folding membrane, or wire, as non-limiting examples.

The multifold panel array can be used in space applications, such as by including solar panels, mirrors, radiators, and/or antenna array elements on the panels. The folding patterns of the panels can include a z-fold, fan-like folds, serpentine accordion fold patterns, and/or twisting-and-blossoming-like schemes such as flasher schemes. The combination of the biasing member, restraint cable, and reeling cable can obviate the need for trusses or booms, reducing mass and expense of the structure.

FIG. 1A is a diagrams of a multifold panel array 100 in an open position. In this example, the multifold panel array 100 can include panels arranged in a flasher pattern. The flasher pattern can include a central panel 102. In this example, the central panel 102 is pentagon shaped. The central panel 102 can include five sides (not labeled in FIG. 1A). As used herein, a "central panel" can also refer to a central member. A central member can include a central panel, or a non-panel structure, such as a spacecreaft or other body to which panels are rotatably attached.

The multifold panel array 100 can include multiple interior panels 104A, 104B, 104C, 104D, 104E. In this example of a pentagon-shaped central panel 102, the multifold panel array 100 includes five interior panels 104A, 104B, 104C, 104D, 104E. The interior panels 104A, 104B, 104C, 104D, 104E can be adjacent to the central panel 102. Each of the interior panels 104A, 104B, 104C, 104D, 104E can be adjacent to one of the sides of the central panel 102. Each of the interior panels 104A, 104B, 104C, 104D, 104E can be rotatably attached to the central panel 102 and/or to one of the sides of the central panel 102. In some examples, interior panels 104A, 104B, 104C, 104D, 104E can be rotatably attached to the central panel 102 and/or to one of the sides of the central panel 102 by a biasing member, such as a torsion spring or lamina emergent tension (LET) joints or arrays of LET joints. LET joints can be integral to the materials used to fabricate the panels 102, 104A, 104B, 104C, 104D, 104E, making the panels 102, 104A, 104B, 104C, 104D, 104E monolithic and/or fabricated from a single piece of planar material, reducing complexity of the fabrication process by reducing the number of parts and the number of processes to manufacture the multifold panel array 100. The biasing members can bias the interior panels 104A, 104B, 104C, 104D, 104E to extend away from the central panel 102 toward a plane parallel to the central panel 102. In some examples, the interior panels 104A, 104B, 104C, 104D, 104E can be rotatably attached to the central panel 102 and/or to one of the sides of the central panel 102 by hinges, and biasing members can be additional components of the multifold panel array 100.

The multifold panel array 100 can include multiple exterior panels 106A, 106B, 106C, 106D, 106E. Each of the exterior panels 106A, 106B, 106C, 106D, 106E can be adjacent to a different one of the interior panels 104A, 104B, 104C, 104D, 104E. Each of the exterior panels 106A, 106B, 106C, 106D, 106E can be rotatably attached to a different one of the interior panels 104A, 104B, 104C, 104D, 104E. The exterior panels 106A, 106B, 106C, 106D, 106E can be rotatably attached to the interior panels 104A, 104B, 104C, 104D, 104E by one of multiple biasing members, such as torsion springs. The biasing members can bias the exterior panels 106A, 106B, 106C, 106D, 106E to extend away from the interior panels 104A, 104B, 104C, 104D, 104E toward a plane parallel to the interior panel 104A, 104B, 104C, 104D, 104E to which the exterior panel 106A, 106B, 106C, 106D, 106E is rotatably attached. The exterior panels 106A, 106B, 106C, 106D, 106E can extend and/or fold away from the interior panels 104A, 104B, 104C, 104D, 104E in a direction opposite from a direction that the interior panels 104A, 104B, 104C, 104D, 104E extend and/or fold away from the central panel 102, and/or the exterior panels 106A, 106B, 106C, 106D, 106E can extend toward a plane extending through the central panel 102, causing intersections and/or folds between the interior panels 104A, 104B, 104C, 104D, 104E and the exterior panels 106A, 106B, 106C, 106D, 106E to form peaks and/or mountains. Additional panels (not labeled in FIG. 1A) can extend from the exterior panels 106A, 106B, 106C, 106D, 106E and/or interior panels 104A, 104B, 104C, 104D, 104E in alternating directions, forming peaks and/or mountains as well as valleys at intersections and/or folds between panels.

The solid lines shown in FIG. 1A represent multiple restraint cables. The restraint cables can each be attached to two adjacent panels. The restraint cables can establish limits for how close toward parallel adjacent panels can extend. The restraint cables can establish limits to how flat the multifold panel array 100 can be when fully deployed and/or open.

The dashed lines shown in FIG. 1A represent reeling cables. The reeling cables can attach to, and/or extend through, adjacent panels. The multifold panel array 100 can include a single reeling cable extending through the panels, or multiple reeling cables originating from the central panel 102. The multifold panel array 100 can include a reeling actuator (not shown in FIG. 1A) to control the length of the reeling cable(s). The reeling actuator can shorten and/or contract the reeling cable(s) to fold the panels together and/or reduce the size of the multifold panel array. The reeling actuator can lengthen and/or expand the reeling cable(s) to allow the panels to spread apart and/or deploy. The multifold panel array 100 is shown in the deployed, expanded, open, and/or flattest position in FIG. 1A, in which the reeling cables are expanded and/or lengthened so that the reeling cables are not applying significant force opposing the biasing members. In the deployed, expanded, and/or flattest position shown in FIG. 1A, the restraining force of the restraining cables is equal and opposite to the biasing force of the biasing members, maintaining the shape of the multifold panel array 100 in the static position shown in FIG. 1A.

Figure 1B:
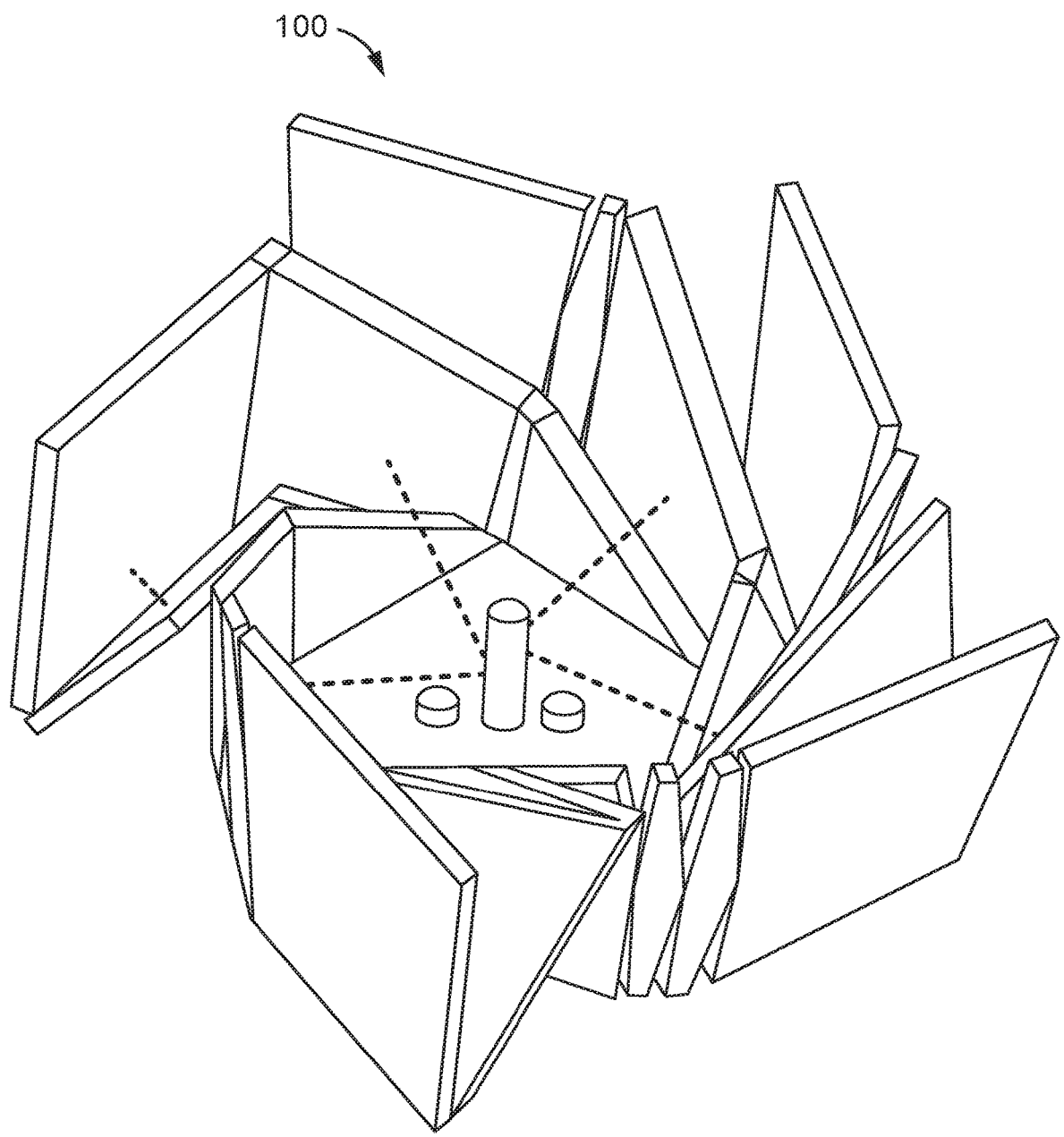
FIG. 1B is a diagram of the multifold panel array of FIG. 1A in a closed position.

FIG. 1B is a diagram of the multifold panel array 100 of FIG. 1A in a closed position. In this example, the reeling cable(s) has contracted, pulling the panels other than the central panel 102 closer to the central panel 102 into the closed and/or folded position. In this example, some, and/or a majority of, the panels other than the central panel 102 are perpendicular to, and/or nearly perpendicular to, such as within five degrees (5°) of perpendicular to, the central panel 102, into the closed position. The closed position minimizes space and/or volume occupied by the multifold panel array 100, facilitating storage of the multifold panel array 100.

Figure 1C:
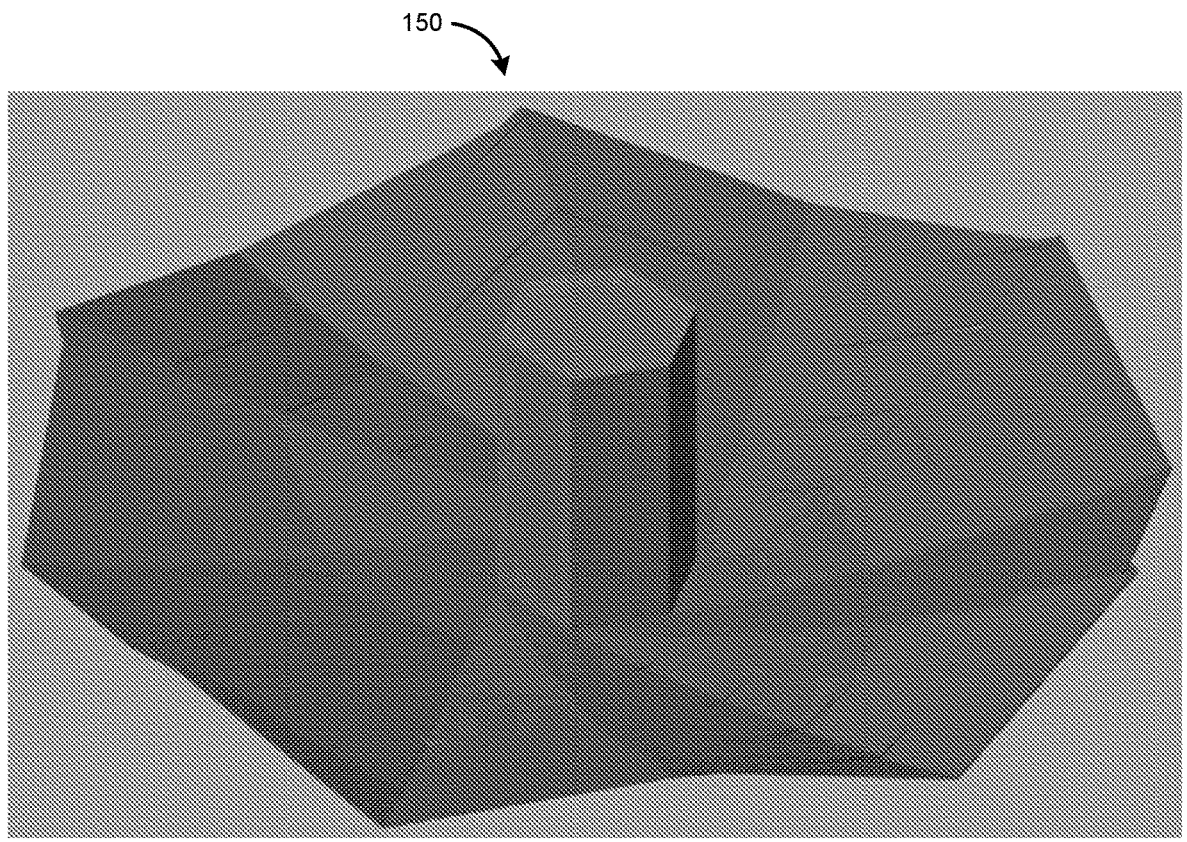
FIG. 1C is a diagram of a multifold panel array in an open position.

FIG. 1C is a diagram of a multifold panel array 150 in an open position. In this example, the multifold panel array 150 includes a hexagon-shaped central panel with six sides. The extension of the hexagon-shaped panel in a third direction is shown for illustrative purposes only. The hexagon-shaped panel can have similar features to the central panel 102 described above.

The multifold panel array 150 shown in FIG. 1C can include six interior panels with features similar to the interior panels 104A, 104B, 104C, 104D, 104E described above. The multifold panel array 150 shown in FIG. 1C can include multiple exterior panels with features similar to the exterior panels 106A, 106B, 106C, 106D, 106E described above. The multifold panel array 150 shown in FIG. 1C can include additional panels extending from the interior panels and/or exterior panels with features similar to the additional panels described above with respect to FIGS. 1A and 1B. The multifold panel array 150 can include biasing members, restraining cables, one or more reeling cables, and/or one or more reeling actuators with similar features to the biasing members, restraining cables, one or more reeling cables, and/or one or more reeling actuators described above.

Figure 1D:
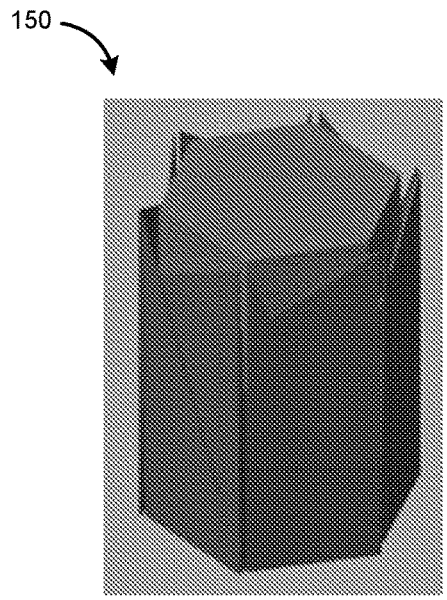
FIG. 1D is a diagram of the multifold panel array of FIG. 1C in a closed position.

FIG. 1D is a diagram of the multifold panel array 150 of FIG. 1C in a closed position. The reeling cable has pulled the panels other than the central panel toward the central panel into a position perpendicular to, and/or nearly perpendicular to, such as within five degrees (5°) of perpendicular to, the central panel, into the closed position. The closed position minimizes space and/or volume occupied by the multifold panel array 150, facilitating storage of the multifold panel array 150.

Figure 2A:
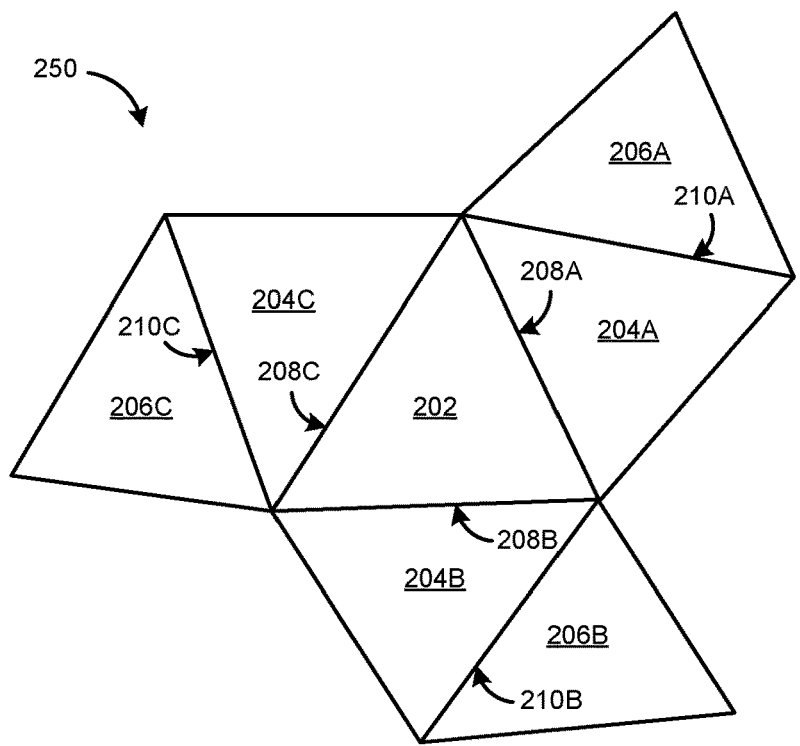
FIG. 2A is a diagram of a multifold panel array.

FIG. 2A is a diagram of a multifold panel array 200. The multifold panel array 200 includes a central panel 202. In the example shown in FIG. 2A, the central panel 202 is triangular, and includes three sides 208A, 208B, 208C.

The multifold panel array 200 can include a number of interior panels 204A, 204B, 204C equal to the number of sides 208A, 208B, 208C of the central panel 202. The interior panels 204A, 204B, 204C can be rotatably attached to the sides 208A, 208B, 208C of the central panel 202. The first interior panel 204A can be rotatably attached to the first side 208A, the second interior panel 204B can be rotatably attached to the second side 208B, and the third interior panel 204C can be rotatably attached to the third side 208C.

The multifold panel array 200 can include exterior panels 206A, 206B, 206C rotatably attached to the interior panels 204A, 204B, 204C. The exterior panels 206A, 206B, 206C can be rotatably attached to the interior panels 204A, 204B, 204C at sides 210A, 210B, 210C of the interior panels 204A, 204B, 204C other than the sides at which the interior panels 204A, 204B, 204C are attached to the central panel 202. The multifold panel array 200 can include additional panels rotatably attached to the interior panels 204A, 204B, 204C, to the exterior panels 206A, 206B, 206C, and/or to the additional panels. The multifold panel array 200 can form peaks or mountains, and alternating valleys, at the intersections, attachment segments, and/or sides 208A, 208B, 208C of the panels 202, 204A, 204B, 204C, 206A, 206B, 206C.

The multifold panel array 200 can include biasing members (shown in FIGS. 3A and 3B) attached to adjacent and/or rotatably attached pairs of panels 202, 204A, 204B, 204C, 206A, 206B, 206C. The biasing members can rotatably attach adjacent panels 202, 204A, 204B, 204C, 206A, 206B, 206C to each other. The biasing members can bias the panels 202, 204A, 204B, 204C, 206A, 206B, 206C to extend away from the respective adjacent panel 202, 204A, 204B, 204C, 206A, 206B, 206C and/or panel 202, 204A, 204B, 204C, 206A, 206B, 206C to which the panel 202, 204A, 204B, 204C, 206A, 206B, 206C is attached, and/or toward a plane parallel to and/or extending through the adjacent panel 202, 204A, 204B, 204C, 206A, 206B, 206C and/or panel 202, 204A, 204B, 204C, 206A, 206B, 206C to which the panel 202, 204A, 204B, 204C, 206A, 206B, 206C is attached.

In the example of FIG. 2A, a first interior biasing member is attached to the central panel 202 and the first interior panel 204A. The first interior biasing member biases the first interior panel 204A to extend away from the central panel 202 toward a plane parallel to the central panel 202. A second interior biasing member is attached to the central panel 202 and the second interior panel 204B. The second interior biasing member biases the second interior panel 204B to extend away from the central panel 202 toward a plane parallel to the central panel 202. A third interior biasing member is attached to the central panel 202 and the third interior panel 204C. The third interior biasing member biases the third interior panel 204C to extend away from the central panel 202 toward a plane parallel to the central panel 202. A first exterior biasing member is attached to the first interior panel 204A and the first exterior panel 206A. The first exterior biasing member biases the first exterior panel 206A to extend away from the first interior panel 204A toward a plane parallel to the first interior panel 204A. A second exterior biasing member is attached to the second interior panel 204B and the second exterior panel 206B. The second exterior biasing member biases the second exterior panel 206B to extend away from the second interior panel 204B toward a plane parallel to the second interior panel 204B. A third exterior biasing member is attached to the third interior panel 204A and the third exterior panel 206C. The third exterior biasing member biases the third exterior panel 206C to extend away from the third interior panel 204C toward a plane parallel to the third interior panel 204C.

The multifold panel array 200 can include restraint cables (shown in FIGS. 3A and 3B) attached to adjacent and/or rotatably attached panels 202, 204A, 204B, 204C, 206A, 206B, 206C. The restraint cables can prevent rotatably attached and/or adjacent panels 202, 204A, 204B, 204C, 206A, 206B, 206C from rotating beyond a predetermined degree away from each other.

In the example of FIG. 2A, a first interior restraint cable is attached to the central panel 202 and the first interior panel 204A. The first interior restraint cable restrains the first interior panel 204A from extending along the plane parallel to the central panel 202. A second interior restraint cable is attached to the central panel 202 and the second interior panel 204B. The second interior restraint cable restrains the second interior panel 204B from extending along the plane parallel to the central panel 202. A third interior restraint cable is attached to the central panel 202 and the third interior panel 204C. The third interior restraint cable restrains the third interior panel 204C from extending along the plane parallel to the central panel 202. A first exterior restraint cable is attached to the first interior panel 204A and the first exterior panel 206A. The first exterior restraint cable restrains the first exterior panel 206A from extending along the plane parallel to the first interior panel 204A. A second exterior restraint cable is attached to the second interior panel 204B and the second exterior panel 206B. The second exterior restraint cable restrains the second exterior panel 206B from extending along the plane parallel to the second interior panel 204B. A third exterior restraint cable is attached to the third interior panel 204C and the third exterior panel 206C. The third exterior restraint cable restrains the third exterior panel 206C from extending along the plane parallel to the third interior panel 204C.

Figure 3A:
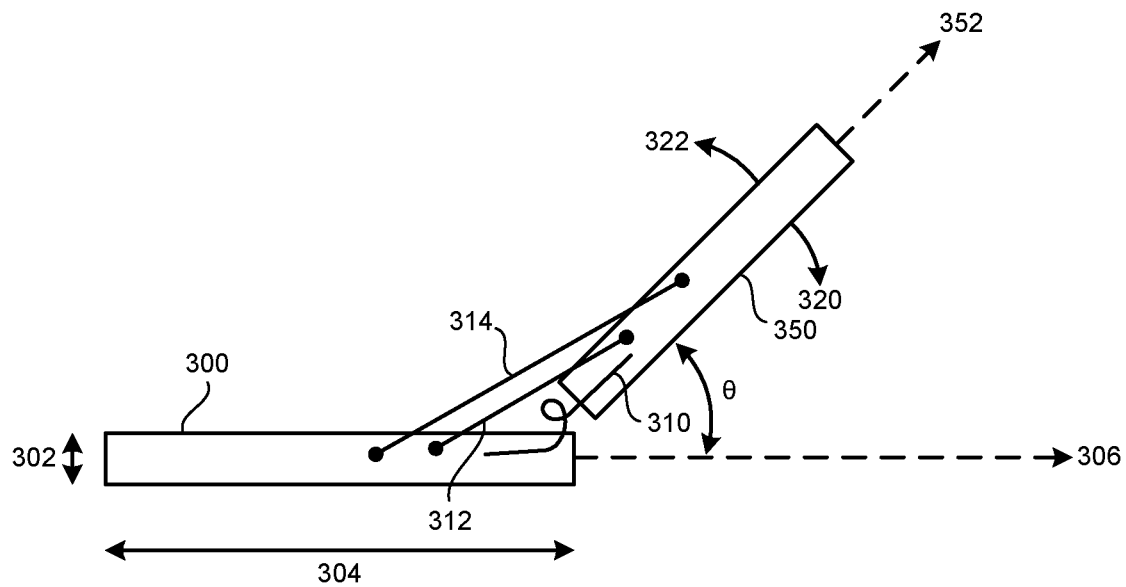
FIG. 3A is a diagram of adjacent panels.
Figure 3B:
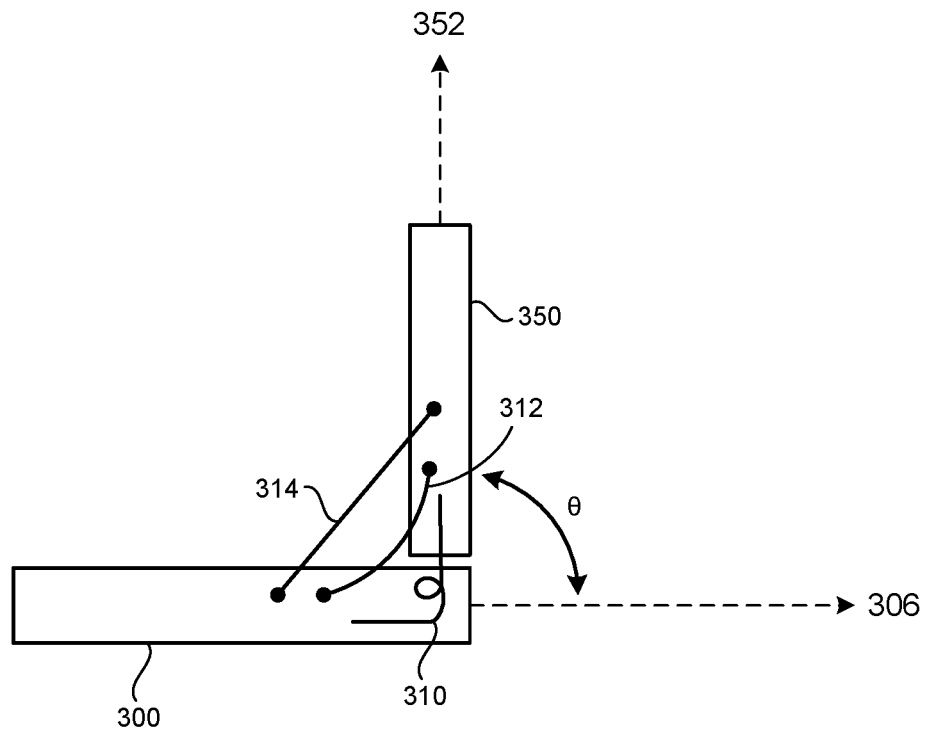
FIG. 3B is a diagram of the adjacent panels of FIG. 3A after a reeling cable has contracted.

The multifold panel array 200 can include one or more reeling cables (shown in FIGS. 3A and 3B). The one or more reeling cables can be coupled to the first interior panel 204A, the second interior panel 204B, the third interior panel 204C, the first exterior panel 206A, the second exterior panel 206B, and/or the third exterior panel 206C. A length of the reeling cable can control the angles at which the rotatably attached panels 202, 204A, 204B, 204C, 206A, 206B, 206C extend from each other. At the longest and/or most expanded position, the reeling cable can allow the multifold panel array 200 to extend in an open and/or deployed position, similar to the positions shown in FIGS. 1A and 1C. At the shortest and/or most contracted position, the reeling cable can cause the multifold panel array 200 to fold into a closed position, similar to the positions shown in FIGS. 1B and 1D.

The multifold panel array 200 can include a reeling actuator 225. The reeling actuator 225 can be disposed on the central panel 202. The reeling actuator 225 can control the length of the reeling cable(s), and/or control a speed or time over which the length of the reeling cable(s) changes. By changing the length of the reeling cable, the reeling actuator 225 can change angles of inclination between the rotatably attached panels 202, 204A, 204B, 204C, 206A, 206B, 206C. The reeling actuator 225 can change angles of inclination between the first interior panel 204A and the central panel 202, between the second interior panel 204B and the central panel 202, between the third interior panel 204C and the central panel 202, between the first exterior panel 206A and the first interior panel 204A, between the second exterior panel 206B and the second interior panel 204B, and/or between the third exterior panel 206C and the third interior panel 204C. In some examples, to minimize and/or reduce vibrations in the multifold panel array 200, the reeling actuator 225 can allow and/or cause the reeling cable to expand and allow the multifold panel array 200 to deploy and/or change length of the reeling cable from the minimum length to the maximum length, transitioning the multifold panel array 200 from the closed position to the open position, over a time period of at least half of a second. The actuator 225 can be controlled remotely by an operator sending wireless signals to the actuator 225, or autonomously based on signals and/or information received by a controller of the actuator 225, such as a location of the controller and/or multifold panel array 200 with respect to other objects.

Figure 2B:
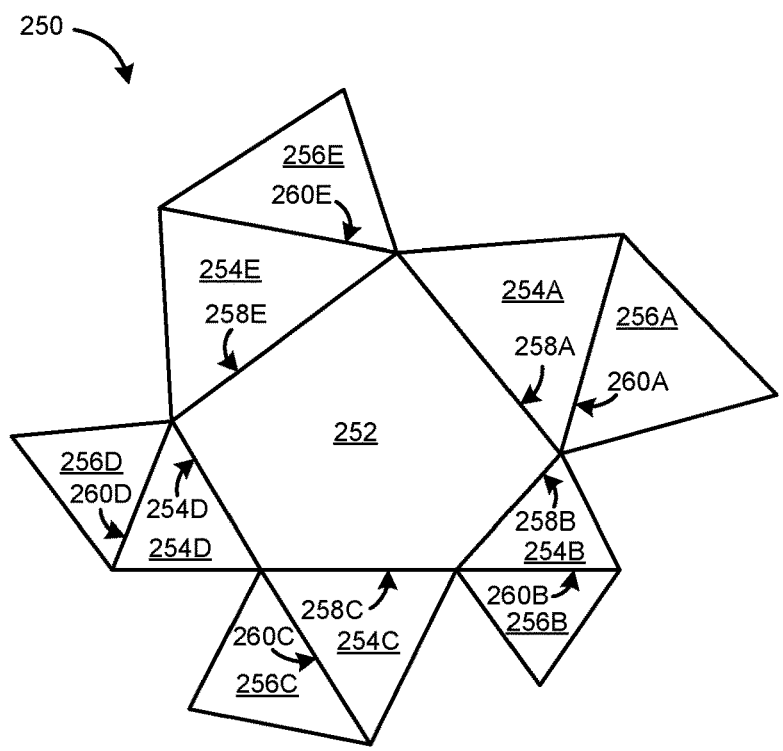
FIG. 2B is a diagram of a multifold panel array.

FIG. 2B is a diagram of a multifold panel array 250. In this example, the central panel 252 is a pentagon with five sides 258A, 258B, 258C, 258D, 258E. In this example, the multifold panel array 250 includes five interior panels 254A, 254B, 254C, 254D, 254E with similar features to the three interior panels 204A, 204B, 204C described above with respect to FIG. 2A. In this example, the multifold panel array 250 includes exterior panels 256A, 256B, 256C, 256D, 256E with features similar to the exterior panels 206A, 206B, 206C described above with respect to FIG. 2A. The multifold panel array 250 can include biasing members, restraint cables, one or more reeling cables, and/or one or more reeling actuators 275 with features similar to the biasing members, restraint cables, one or more reeling cables, and/or one or more reeling actuators 225 described above with respect to the multifold panel array 200 of FIG. 2A.

FIG. 3A is a diagram of adjacent panels 300, 350. The adjacent panels 300, 350 can include any pair of adjacent panels described above that are rotatably attached to each other, such as a central panel 102, 202, 252, an interior panel 204A, 204B, 204C, 254A, 254B, 254C, 254D, 254E, an exterior panel 206A, 206B, 206C, 256A, 256B, 256C, 256D, 256E, and/or any additional panels. FIG. 3A shows elements that can be included in any apparatus described herein, such as a multifold panel array.

The panels 300, 350 can have lengths 304 (labeled with reference to the panel 300 for ease of illustration) and/or widths of at least one meter. The length 304 can be measured from a midpoint of a side to a midpoint of an opposite side in an example panel 300, 350 with an even number of sides, or from a midpoint of a side to an opposing vertex in an example panel 300, 350 with an odd number of sides. The panels 300, 350 can have thicknesses 302 (labeled with reference to the panel 300 for ease of illustration) of less than five centimeters. The length 304 and/or width of the panels 300, 350 can be ten times or a hundred times the thickness 302 of the panels 300, 350, and/or the thickness 302 of the panels 300, 350 can be one-tenth or one-hundredth the length 304 or width of the panels 300, 350. The panels 300, 350 can be made of, and/or include, rigid materials such as metal, plastic, and/or polymer.

The panels 300, 350 can be rotatably attached to each other by a biasing member 310. The biasing member 310 can include, for example, a torsion spring. The torsion spring can be attached to both of the panels 300, 350 at opposite ends of the torsion spring.

The biasing member 310 can bias the panel 350 to extend away from the panel 300 and toward a plane 306 that is parallel to the panel 300. The plane 306 can extend through the panel 300. The panel 350 can form an angle θ with the plane 306. The angle θ can be considered an angle of inclination between the panels 300, 350. A biasing force of the biasing member 310 on the panel 350 can act to reduce the angle θ. In some examples, in the absence of any counteracting force (such as a restraining force of a restraining cable 312 described below), the biasing force of the biasing member 310 on the panel 350 can act to reduce the angle θ to zero, bringing the panel 350 into a parallel position with the panel 300. In some examples, in the absence of any counteracting force, the biasing member 310 can cause the panel 350 to pass through the plane 306, and/or cause the angle θ to become negative.

A restraining cable 312 can be attached to both panels 300, 350. The restraining cable 312 can generate a restraining force that opposes the biasing force generated by the biasing member 310, and/or pulls the panel 350 away from the plane 306 parallel to the panel 300. The restraining cable 312 can prevent the panel 350 from extending along the plane 306 parallel to the panel 300, and/or can prevent the angle θ from becoming zero. A length of the restraining cable 312 can be fixed so that, in conjunction with the locations of the anchor points in the panels 300, 350 for the restraining cable 312, the restraining force of the restraining cable 312 and the biasing force of the biasing member 310 are equal and opposite at a selected angle θ, fixing the relative positions of the panels 300, 350 in the open and/or deployed position.

A reeling cable 314 can be attached to both panels 300, 350. In some examples, the reeling cable 314 can be slidably attached to both panels 300, 350, such as by extending through slots or apertures defined by the panels 300, 350, so that the reeling cable 314 can extend through, and/or be slidably attached to, multiple pairs of adjacent panels.

The reeling cable 314 can generate a reeling force that complements the restraining force generated by the restraining cable 312, and/or opposes the biasing force generated by the biasing member 310. The reeling force can pull the panel 350 away from the plane 306 that is parallel to the panel 300. A magnitude of the reeling force can depend on the length of the reeling cable 314. The length of the reeling cable 314 can be controlled by the reeling actuator 225, 275 (shown in FIGS. 2A and 2B). When the reeling cable 314 is at a longest and/or maximum length, and/or when the length of the reeling cable 314 is at a deployed length or greater, the reeling force can be zero, and the restraining force and the biasing force can be equal and opposite, fixing the angle θ at the deployed or open position. When the reeling cable 314 contracts and/or is shortened to be shorter than the deployed length, the reeling force can complement the restraining force, increasing the angle θ until the restraining cable 312 becomes slack. When the restraining cable 312 becomes slack, the restraining force becomes zero, and the reeling force and the biasing force oppose each other.

FIG. 3B is a diagram of the adjacent panels 300, 350 of FIG. 3A after the reeling cable 314 has contracted. The reeling cable 314 has contracted to have a length shorter than a deployed length, causing the restraining cable 312 to become slack and the restraining force to be zero. The reeling force of the reeling cable 314 and the biasing force of the biasing member 310 oppose each other, causing the angle θ between the panel 350 and the plane 306 extending from the panel 300, an angle between a plane 352 extending from the panel 350 and the plane 306, and/or an angle between the panels 300, 350, to be controlled by the length of the reeling cable 314. When the reeling cable 314 is contracting, the reeling force is greater than the biasing force, and the angle θ increases while the reeling cable 314 is contracting. When the reeling cable 314 is expanding, the biasing force is greater than the reeling force, and the angle θ decreases while the reeling cable 314 is expanding. When the length of the reeling cable 314 is at a minimum length and or is fixed or static in the closed or folded position, the reeling force can be equal and opposite to the biasing force, and the angle θ between adjacent panels 300, 350 can be ninety degrees (90°) or one-hundred eighty degrees (180°), depending on the pair of adjacent panels.

Figure 4A:
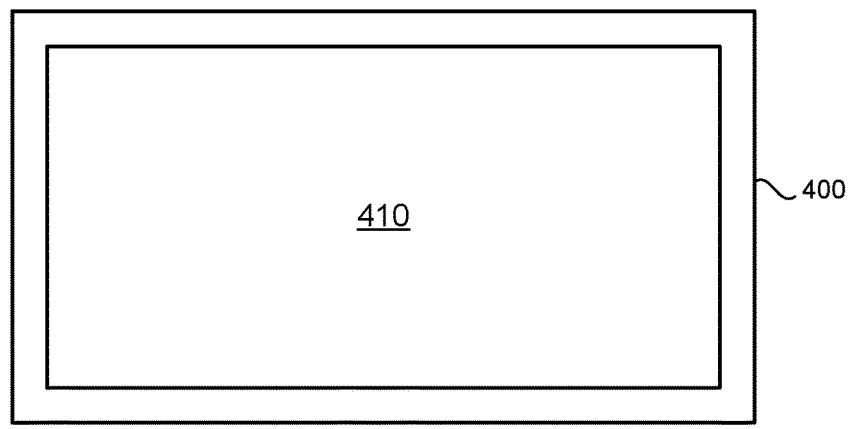
FIG. 4A is a diagram of a panel with a solar panel.

FIG. 4A is a diagram of a panel 400 with a solar panel 410. The panel 400 can be an example of any of the panels 102, 202, 252, 204A, 204B, 204C, 254A, 254B, 254C, 254D, 254E, 206A, 206B, 206C, 256A, 256B, 256C, 256D, 256E, 300, 350 described above. The solar panel 410 can be mounted onto the panel 400. The solar panel 410 can generate electric current from light and/or electromagnetic radiation received by the solar panel 410, taking advantage of the photoelectric effect. In some examples, the solar panel 410, and/or a rechargeable battery electrically coupled to the solar panel 410, can store electric charge generated by the electric current. The panel 400 with the solar panel 410 can be considered a solar panel and/or can be a component of a multifold solar panel array with multiple panels 400, adjacent solar panels, and/or multiple solar panels and other properties of the apparatus and/or multifold panel array 100, 150, 200, 250 described above.

Figure 4B:
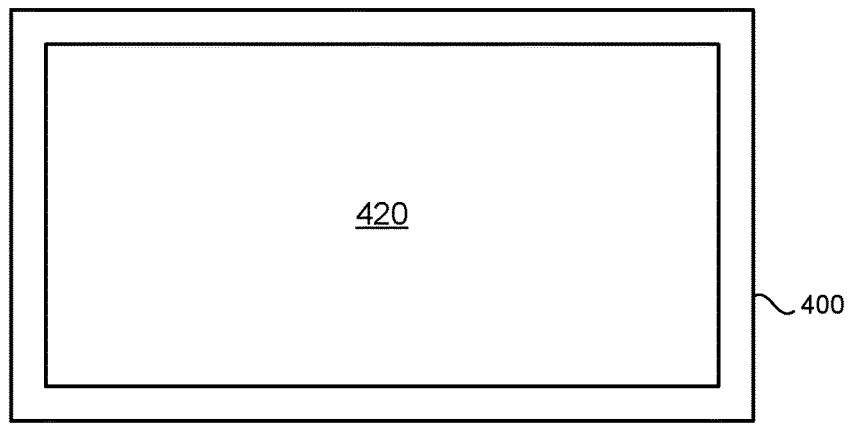
FIG. 4B is a diagram of a panel with a mirror.

FIG. 4B is a diagram of a panel 400 with a mirror 420. The mirror 420 can reflect light and/or electromagnetic radiation. The mirror 420 can be mounted onto the panel 400. The panel 400 with the mirror 420 can be a component of a multifold mirror array with multiple panels 400 and other properties of the apparatus and/or multifold panel array 100, 150, 200, 250 described above.

Figure 4C:
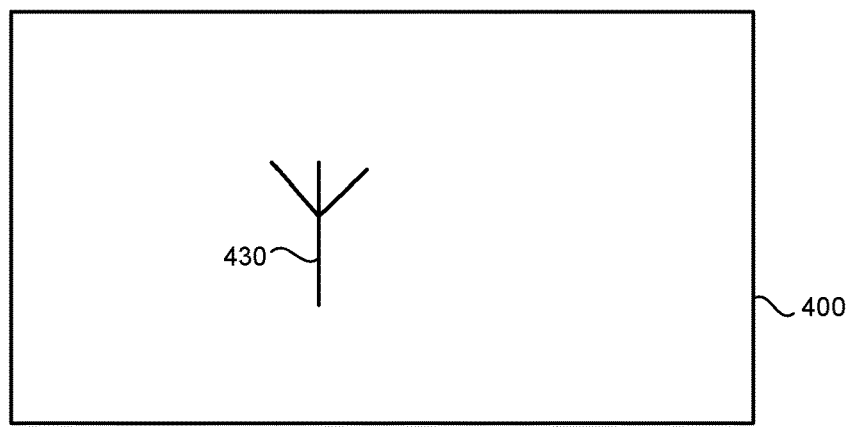
FIG. 4C is a diagram of a panel with an antenna element.

FIG. 4C is a diagram of a panel 400 with an antenna element 430. The antenna element 430 can send and/or receive wireless signals, such as electromagnetic waves. The panel 400 with the antenna element 430 can be a component of a multifold antenna array with multiple panels 400 and other properties of the apparatus and/or multifold panel array 100, 150, 200, 250 described above.

Figure 5:
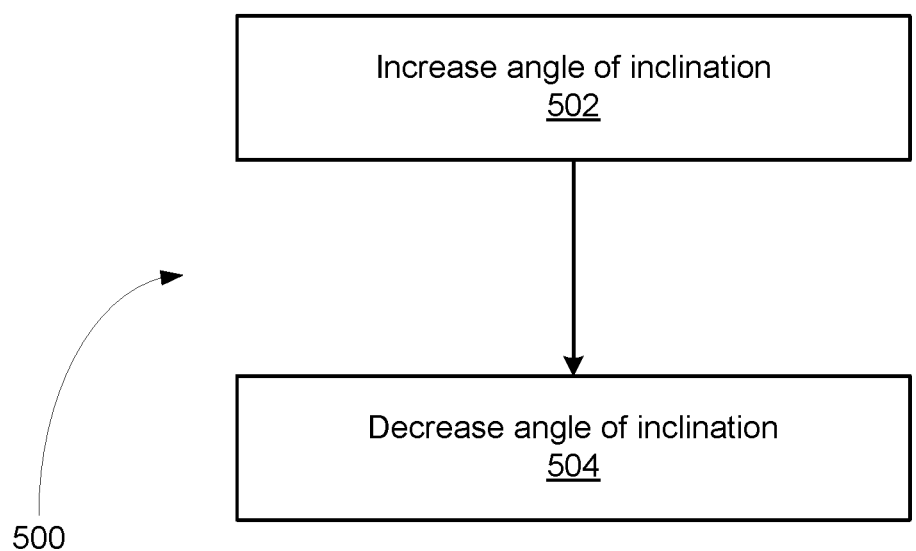
FIG. 5 is a flowchart of a method of controlling a shape of a multifold panel array.

FIG. 5 is a flowchart of a method 500 of controlling a shape of a multifold panel array. The method 500 can comprise increasing an angle of inclination between adjacent panels included in the multifold panel array by contracting a reeling cable (502), and decreasing the angle of inclination between the adjacent panels by expanding the reeling cable (504).

In some examples, the adjacent panels can include a central member and multiple interior panels adjacent to the central member.

The apparatus and/or multifold panel arrays described herein, which can be considered self-deployable self-stiffening and retractable space structure (SDSR) mechanisms, can be fabricated using planar materials, fold up to stow into small volumes, self-deploy via release of stored strain energy, maintain stiffness via preload in a desired large-area three-dimensional shape, and/or be retractable via reeling cables.

These structures and/or apparatuses allow for the fabrication of large-area planar materials such as solar cells, antenna array elements, and/or mirrors to be folded into the small volumes required to transport space structures. Stored strain energy in compliant joints releases to self-deploy once in space to perform the intended function (such as collect solar energy). Stiffness of deployed structures in space is required to maintain control of the spacecraft system; SDSRs obtain stiffness via the preloading of restraint cables. Restraint cables are fastened to adjacent panels within the SDSR reacting the moments in the panels induced by the strained compliant joints connecting the panels. The cables are sized to form the SDSR into a desired global shape. Because the SDSR may not obtain its fully-flat state (a bifurcation state of the mechanism), kinematics are preserved and the SDSR can be predictably retracted using reeling cables. Full or partial retraction can be used to increase stiffness of the SDSR while the spacecraft performs maneuvers or to protect against collision when travelling through micrometeoroid clouds.

The incorporation of structures and/or architectures described herein, compliant joints, and preloaded and retraction cables can combine to create the SDSR and can provide the following traits: the SDSR can allow for the folding of rigid panels; the SDSR can be self-deployable via the release of strain energy in joints; the SDSR can be self-stiffening via the preload of restraint cables; the SDSR can be retractable via the spooling of retraction cables. These traits can obviate the need for the SDSR to require external deployment, support, stiffening, or retracting mechanisms.

In some examples, the following procedures can be used to design the SDSR: A. Derive an analytic model to describe dynamics and statics of an embodiment of the SDSR. B. Develop computer models using a computational dynamics software package and extend the computer model to complex SDSRs with many degrees of freedom (DOF). C. Verify the models by comparing against the analytic model and against physical prototypes. These procedures are discussed below.

Figure 6:
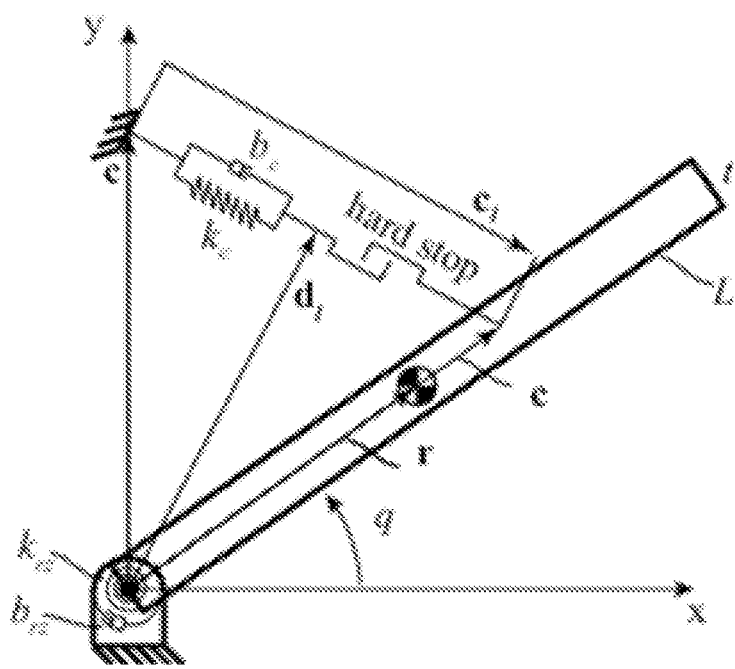
FIG. 6 shows a definition of self-deployable self-stiffening and retractable space structure (SDSR) model components.

For the analytic model, an Euler-Lagrange approach can be used to develop the equation of motion (EOM) of a SDSR in the configuration shown in FIG. 6. The following assumptions and simplifications are made in modeling of the SDSR using both the Euler-Lagrange approach and the software: zero-friction, contact forces are not considered, joints lie along the center plane of the panels, damping exists, panels are rigid, and cables and joints are massless. Panels are modeled as rigid bodies. Joints are either modeled as revolute joints with torsion springs and dampers or 6-DOF joints with torsion and extension spring forces and dampers. Cables are modeled as mechanical hard stops with spring forces and dampers upon engagement. The spacecraft is modeled as a rigid body attached to ground.

FIG. 6 shows a definition of the single panel-joint-cable SDSR embodiment. The revolute-joint torsion and damping constants are labeled as $k_{rz}$ and $b_{rz}$, respectively. The cable spring and damping constants are labeled as $k_c$ and $b_c$, respectively. The vectors to points of interest are (written with respect to the inertial coordinate frame xy): to the panel center of mass (COM) r, to the cable-panel connection c, to the cable-force line of action $d_l$, and the distance between the cable-spacecraft connection and the cable-panel connection $c_l$. The length of the panel L and the thickness t are shown. The width of the panel W (centered in and out of the page) is not shown. The generalized coordinate q is shown in its positive direction.

The Euler-Lagrange approach to solving the dynamics of the single panel-joint-cable model uses the energy terms of the Lagrangian:

$$L = T - V \tag{1}$$

where T is the kinetic energy and V is the potential energy. The equations of motion can be determined for each generalized coordinate (for each DOF) using Lagrange's equation in the form of $$\frac{d}{dt}\frac{\partial L}{\partial \dot{q}} - \frac{\partial L}{\partial q} = Q_{nc} \tag{2}$$

where $Q_{nc}$ contains the non-conservative generalized forces in the system (i.e. damping forces). Formulating Equation 1 and substituting the partial derivatives and non-conservative forces into Equation 2 gives the equation of motion for this panel-joint-cable SDSR:

$$\ddot{q}(mr^2 + I_{zz}) - k_{rz}q + k_c \frac{\partial c_l}{\partial q}(c_l - c_0)c* = -b_{rz}\dot{q} + d_l b_c \dot{c}_l c* \tag{3}$$

where $c_l$ is the magnitude of $c_1$, $c_0$ is the natural length of the cable, r is the magnitude of r, $d_l$ is the magnitude of $d_1$, $I_{zz}$ is moment of inertia about z, and m is the mass of the panel. The term c* is multiplied to the cable force and damping terms to account for the mechanical hard stop engagement. c* is 1 when the cable is engaged and 0 when it is not:

$$c* = \frac{\text{sign}(c_l - c_0) + 1}{2} \tag{4}$$

Equation 3 can be rearranged into state-variable form and solved using a numerical ordinary-differential-equation (ODE) solver.

The computational analytics model is motivated by the Derivation of the analytic EOM for complex SDSRs using multi-DOF or over-constrained folding patterns being impractical. Furthermore, parametric models that can change topography and design variables can be useful for running optimization or design-of-experiments (DOE) routines. A parametric model of the SDSR has been implemented in a software package.

Figure 7:
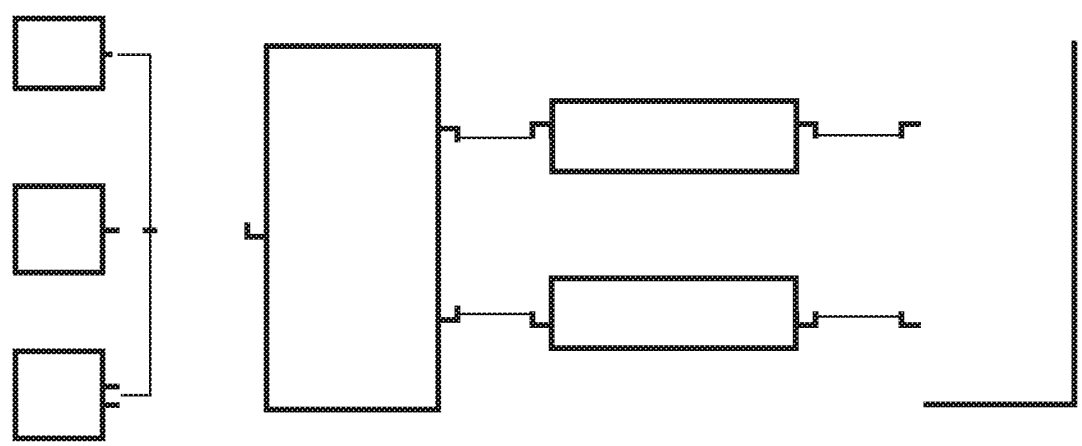
FIG. 7 shows a computational dynamics model block diagram of a single panel-joint-cable SDSR model.

The computational dynamics model is comprised of four types of custom blocks: Spacecraft, Joint, Cable, and Panel. Three standard block are used: Solver Configuration, World Frame, and Mechanism Configuration. FIG. 7 is the block diagram of the computational dynamics model for the single panel-joint-cable SDSR.

Figure 8:
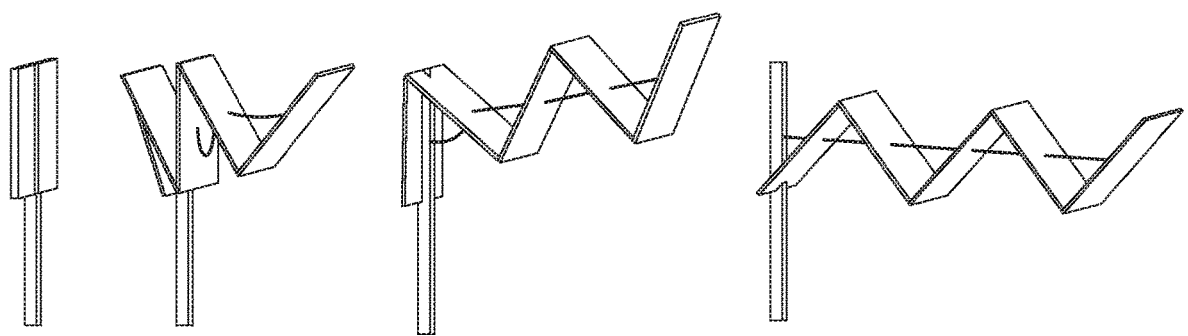
FIG. 8 shows a computational dynamics model of a 5-panel z-fold SDSR.

The Spacecraft can be connected to the world frame (grounded) and be connected to a joint and cable. The joint and cable can be connected to the panel. The Spacecraft and Panel blocks can contain rigid bodies and frame transformations to position cables and joints in the body-fixed frame. The Joint and Cable blocks can contain frame transformations and frame sensors to measure the relative positions and orientations of the connecting rigid bodies (spacecraft or panels) to calculate forces and torques. The block diagram shown in FIG. 7 is for the single panel-joint-cable SDSR. However, scripts can assemble the custom blocks programmatically into the proper topology for a N-panel z-fold SDSR (FIG. 8). These scripts are useful for running DOE routines, running optimization routines, or for design of z-fold SDSRs.

A comparison of the the analytic and computational models follows. The computational model will be compared against physical testing and show the experimental set-up and results for a four-panel z-fold SDSR. This verifies that the computational dynamics model can predict a stiffness-vs-deployment-angle trend.

Figure 9:
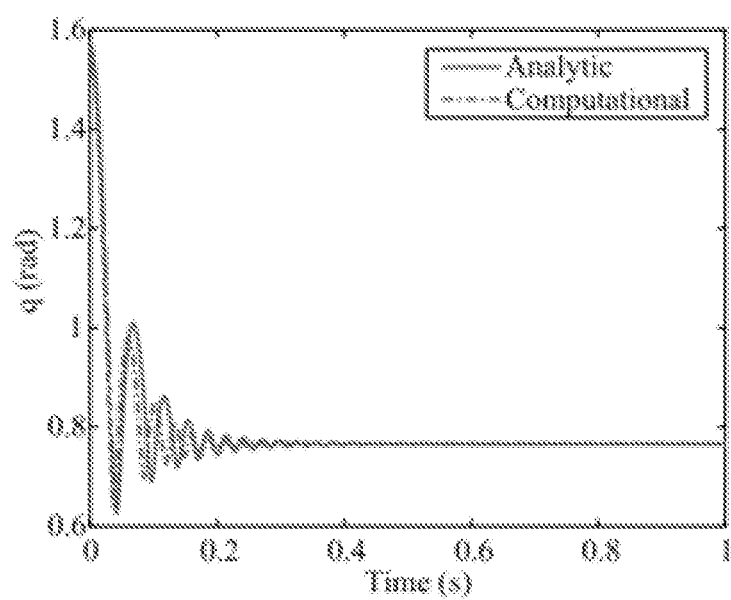
FIG. 9 shows agreement between analytic and computational models.

A computation-dynamics environment has the capacity to model complex SDSRs. To build confidence that this environment can be used to accurately predict the behavior of complex SDSRs, the simple SDSR is modeled in the environment. FIG. 9 shows the free response of both the analytic and the computational models. The panel starts folded at π/2 at time equal zero and is released. The cable is sized to stop the panel at π/4. The models show close agreement for the amplitudes, duration of damped vibration, and steady state responses. Since the computational model closely agrees with the analytic model, one can assume that the computational model can be accurately used for more complex computational systems.

Figure 10A:
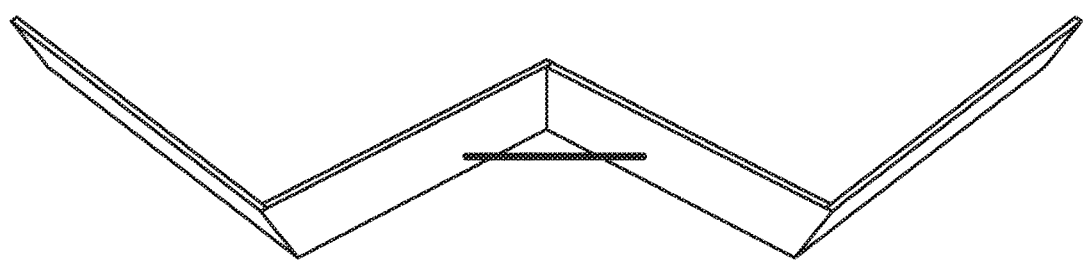
FIG. 10 shows a Z-fold SDSR test set-up from above and from a side.
Figure 10B:
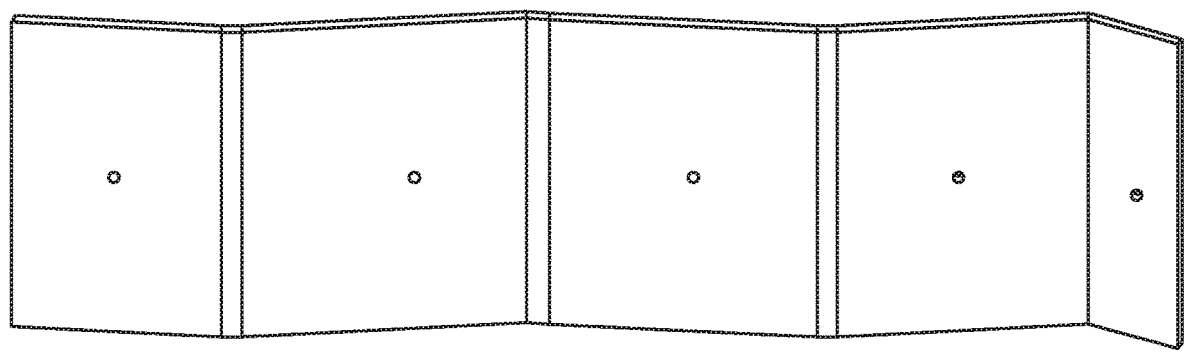

FIGS. 10A (from above) and 10B (from the side) show the experimental set-up for a 4-panel z-fold SDSR. The SDSR was placed in the horizontal plane and suspended from the ceiling to minimize the effects of gravity. The suspension lines were long to take advantage of small-angle-effects on the transverse forces the lines exert on the SDSR. The SDSR was attached to the base using a surrogate fold connected to the first panel and the remaining panels extend outward, each connected by surrogate folds. Each panel had a set of holes to which restraint cables were attached. The restraint cables were able to be attached to pairs of panels using various hole subsets to achieve variable deployment angles. The angles, cable lengths, and cable positions were measured and input into the computational dynamics model.

A force-displacement test was performed by loading the tip of the SDSR with a scale and the displacement was read from the ruled lines beneath. Several force-displacement data were recorded for each set of deployment angles and stiffness values were calculated. The stiffness values were averaged and plotted on FIG. 11. The corrected computational-dynamics-model values are also plotted on the figure to show agreement with the physical testing. A single coefficient was used to calibrate the computational dynamics model as most of the joint stiffness and damping values were estimated and not measured in this experiment. The agreement, however, shows that with calibration (or with accurate estimates of joint values), the computational dynamics model can predict the stiffness-vs-deployment trend for a z-fold SDSR. Retraction capabilities were also demonstrated.

Figure 11:
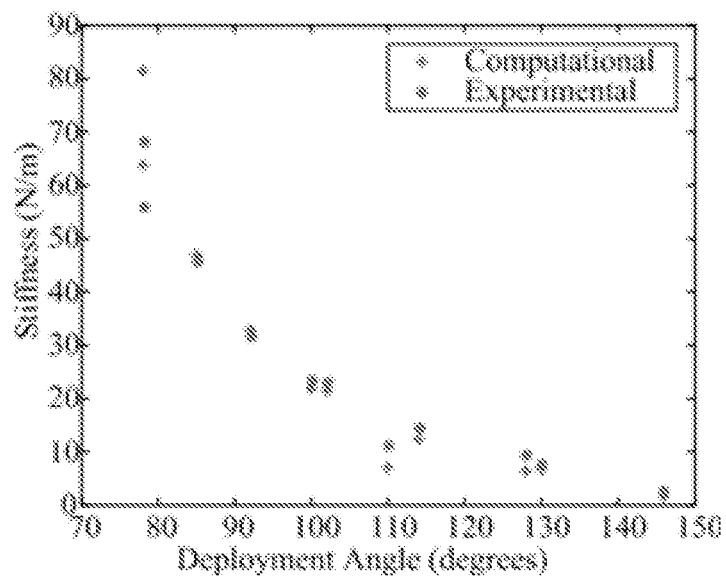
FIG. 11 shows agreement of an SDSR between the computational model and physical testing.

The trend in FIG. 11 indicates that as the SDSR is set to greater deployment angles, the stiffness of the SDSR decreases. This is expected as the moment arm of the applied force increases in length with an increase of deployment.

Using radial embodiments of a z-fold pattern and connecting them in parallel can create more complex SDSRs in the form of an origami flasher pattern. This SDSR design fits within the form of spacecraft launch vehicle fairings and deploys to large areas. The computational model can assemble and simulate the self-deployment and self-stiffening behaviors of these SDSRs. FIGS. 2A and 2B show the stowed and deployed shapes of a flasher SDSR computational model. In this image, the restraint cables are not visualized but maintain the SDSR in its deployed shape.

In some examples, the spatial kinematics for a serpentine accordion origami pattern are developed. The relationships of key values with respect to the single generalized coordinate, deployment angle, are derived. The applications of the developed mathematical models towards the development of self-deployed and self-stiffened space structures are briefly discussed.

Figure 12:
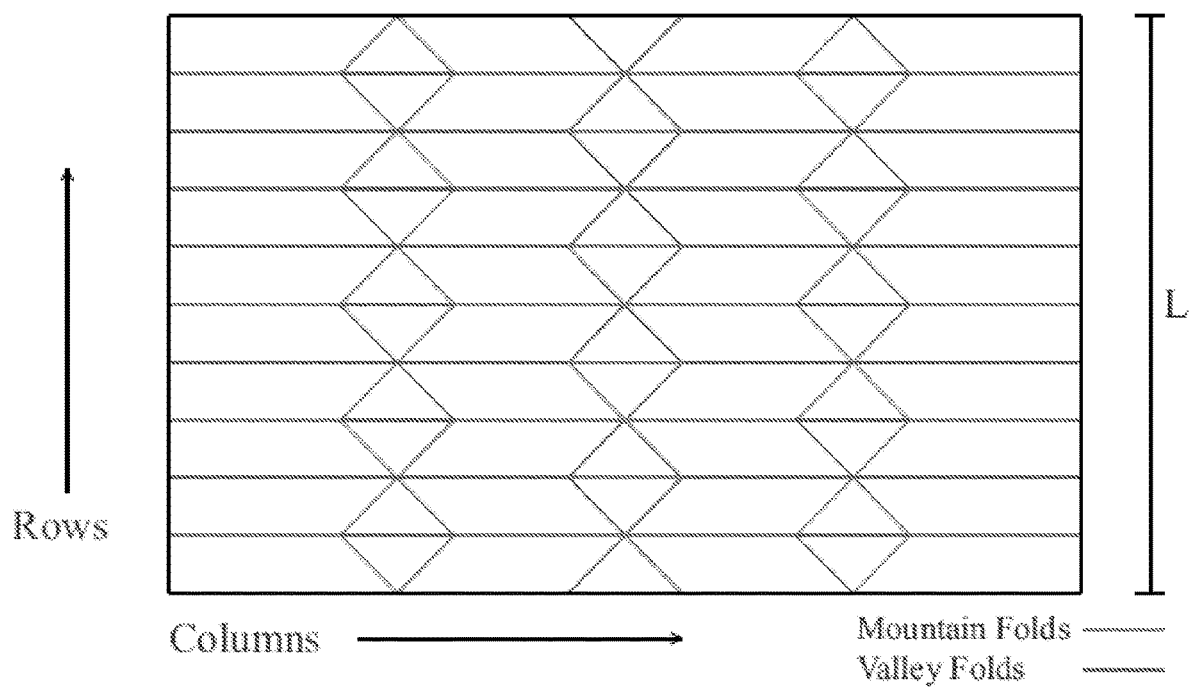
FIG. 12 shows a serpentine accordion fold pattern.
Figure 13:
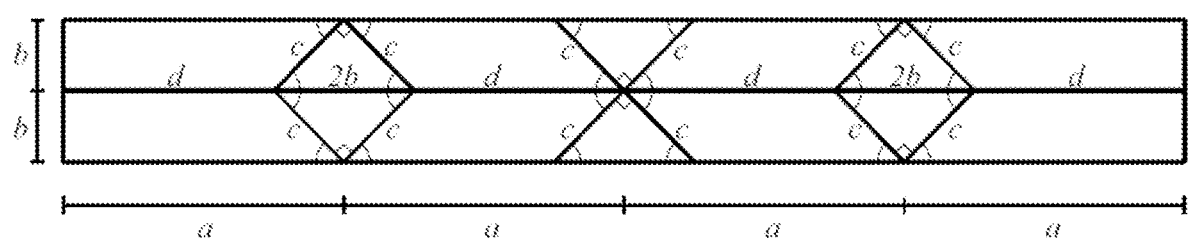
FIG. 13 shows dimensional patterns labeled on a fold pattern.
Figure 14:
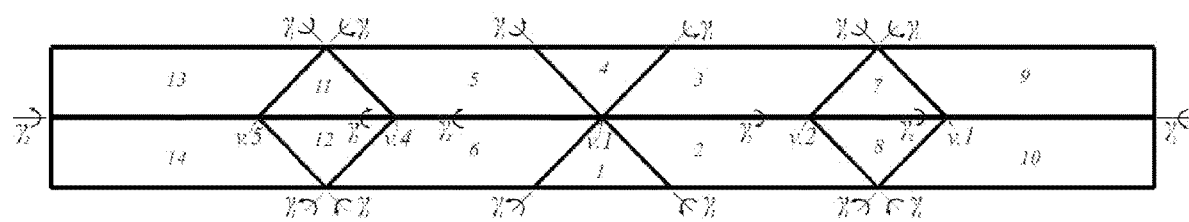
FIG. 14 shows fold angles, vertices, and panel numbers labeled on a fold pattern.

The following nomenclature will be used:
a=stowed square side length
b=row height
c=diagonal length
d=parallelogram length
$R_W$=width ratio
$N_R$=number of rows
$\gamma_n$=fold angle n
$\phi$=deployment angle
$A_{proj,norm}$=normalized projected area
$A_{proj,tot}$=total projected area
$^0d_{COM,p}$=vector to COM on panel p in frame 0
$^id_{jk}$=vector between frame j and k in frame i
$l_i$=length of constraint line i
$R_x(\theta)$=x-axis rotation matrix
$R_z(\theta)$=z-axis rotation matrix
$^0R_p$=Rotation from frame 0 to body-fixed on p
v.n=vertex n
Subscripts:
p=panel number
i=index counter
c=constraint number
COM=center of mass A fold pattern shown in FIGS. 12, 13, and 14 can be the basis of a space structure. Space structures such as the one considered here can self-deploy and self-stiffen. The self-deployment can enabled by implementing a strained joint method to store strain energy to be used for actuation. Self-stiffening can be enabled by the strategic location of constraint lines. These constraints can prevent the structure from fully deploying flat, maintaining a 'pre-stressed' stiffened behavior.

The foundational mathematics required to analyze and design this structure follows. This addresses issues of the length required of the constraints to maintain a certain deployment angle, and how much surface area of the structure is projected onto a plane at the maintained deployment angle. The results of this work will be used to develop stiffness models and equations of motion of the space structure.

The pattern chosen for analysis in this example is a serpentine accordion fold pattern. The fold pattern and fold assignments (either mountain or valley) are shown in FIG. 12, with a serpentine accordion fold pattern with a width ratio of four and ten rows.

The fold pattern parameters are (shown deployed flat in FIG. 13): the stowed square side length a, the width ratio $R_W$, and the number of rows $N_R$, where $N_R \geq 2$ and is an integer. The dependent pattern values as functions of the parameters are: the row height $$b = \frac{a}{R_W} \tag{1}$$

the parallelogram length $$d = a - b \tag{2}$$

and the diagonal length $$c = b\sqrt{2} \tag{3}$$

Figure 15:
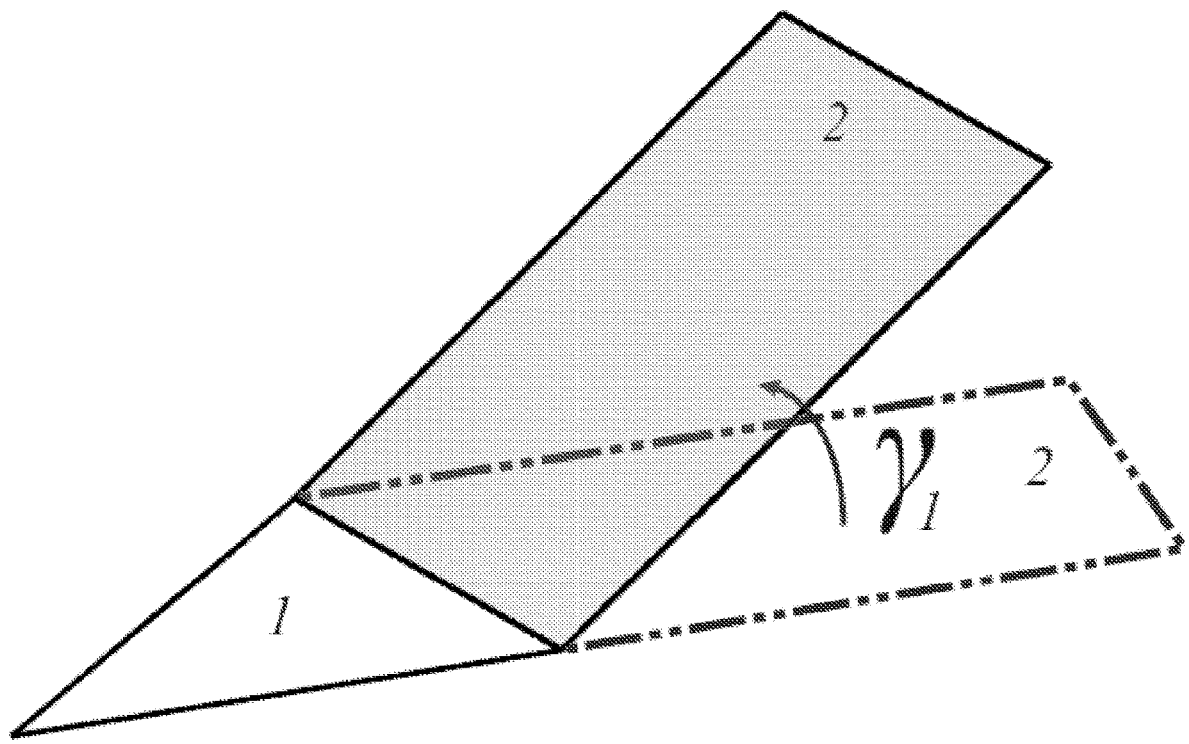
FIG. 15 shows an example of a fold angle.

This analysis can find the locations of the centers of mass (COM) $^0d_{COM,p}$ with respect to the base frame, the lengths of the constraint lines $l_i$, and the normalized projected area $A_{proj,norm}$ of the panels onto the x-y plane, all in terms of the deployment angle $\phi$. The deployment angle is the generalized coordinate that drives the single degree of freedom mechanism. The fold angles are labeled in FIG. 14 and are defined by the panel plane and the panel adjacent to it (e.g. the angle $\gamma_1$ between the plane of panel 1 and the adjacent panel 2 as clarified by FIG. 15) and are $$\gamma_2 = \phi - \pi \tag{4}$$

and $$\gamma_1 = -2 \arctan\left[\sqrt{2} \tan\left(\frac{\gamma_2}{2}\right)\right] \tag{5}$$

Equation 5 is the relationship for a degree-four vertex. Because of the over-constrained nature of the serpentine accordion pattern, the degree-six vertex (v.1 in FIG. 15, the intersection of panels 1-6) can be considered two degree-four vertices vertically mirrored and Equation 5 can be used for fold angles $\gamma_1$ and $\gamma_2$.

Figure 16:
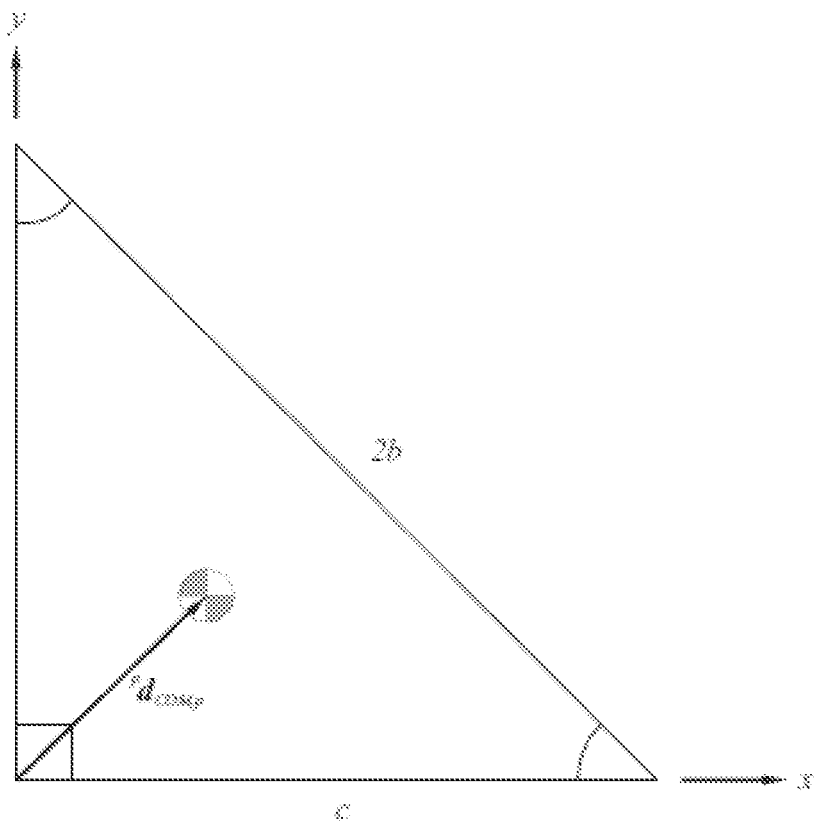
FIG. 16 shows a location of frames and a vector to a center of mass in a top diagram, and vectors to constraint locations in a bottom diagram.
Figure 16:
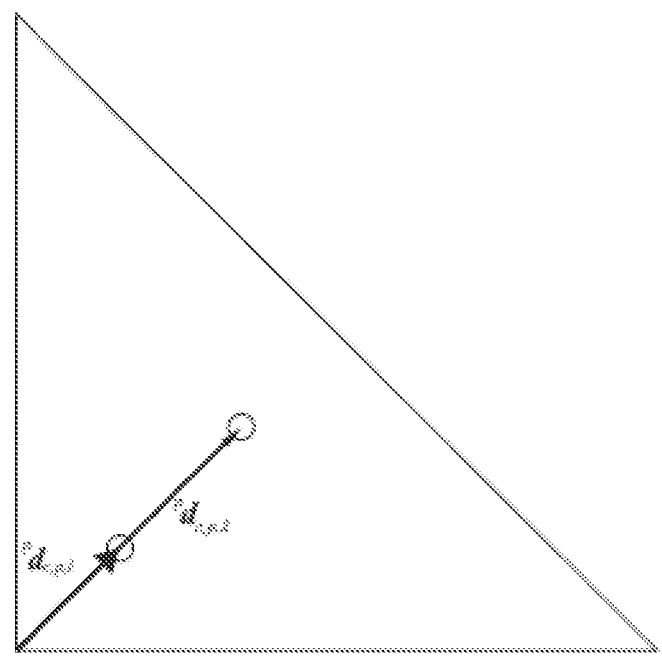

To derive the kinematics of particular points of interest, the geometry, orientation, and position of each panel are determined. Each panel has a body-fixed frame attached to the corner coincident with the current vertex, the x-axis colinear with the first fold line (counting counter-clockwise), and the y-axis coplanar with the panel. FIG. 16 shows the body-fixed frame for panel 1 (which is identical to panel 4), and the panel geometry, including center of mass and constraint locations. Similar definitions for each panel are shown in the Appendix.

The locations and orientations for each panel are determined by a series of translations and rotations. The translations occur mathematically in the body-fixed frames, followed by the appropriate sequence of body-fixed rotations. The two types of rotations used here are a rotation about the x-axis, denoting the rotation due to a fold angle, and a rotation about the z-axis, denoting a sector angle sweep to the next fold line. The rotations are represented as matrices to be multiplied by the body-fixed vector of the location of interest. The x-axis rotation matrix is $$R_x(\theta) = \begin{bmatrix} 1 & 0 & 0 \\ 0 & \cos(\theta) & -\sin(\theta) \\ 0 & \sin(\theta) & \cos(\theta) \end{bmatrix} \quad (6)$$

and the z-axis rotation matrix is $$R_z(\theta) = \begin{bmatrix} \cos(\theta) & -\sin(\theta) & 0 \\ \sin(\theta) & \cos(\theta) & 0 \\ 0 & 0 & 1 \end{bmatrix} \quad (7)$$

To position the vertex of the first panel with respect to the base frame, the distance from the vertex to the grounded edge is $$^0d_{01} = [0\,b\,\cos(-\gamma_2/2)\,-b\,\sin(-\gamma_2/2)]^T \quad (8)$$

Any point on panel 1 can be obtained by first translating to the body-fixed frame of panel 1 (Eqn. 8) rotating to align with the body-fixed frame using the set of rotation matrices $$^0R_1 = R_x(\gamma_2/2)R_z(-3\pi/4) \quad (9)$$

so that the location of a point, expressed in terms of the base frame, is pre-multiplied by $^0R_1$. For example, the location of the center of mass of panel 1 (with respect to frame 1) is $$^1d_{COM,1} = [c/3\,c/3\,0]^T \quad (10)$$

and is pre-multiplied by the appropriate rotation matrix (Eqn. 39) and added to the offset (Eqn. 8):

$$^0d_{COM,1} = 0R_1{}^1d_{COM,1} + {}^0d_{01} \quad (11)$$

The remaining rotation matrices and body-fixed locations of centers of mass for each panel are listed in the Appendix. The location of the center of mass for any panel p on the first vertex is $$^0d_{COM,p} = {}^0R_p{}^p d_{COM,p} + {}^0d_{01} \quad (12)$$

if the panel is on the second vertex, the locations are $$^0d_{COM,p} = {}^0R_p{}^p d_{COM,p} + {}^0d_{01} + {}^0R_2{}^2 d_{12} \quad (13)$$

where $$^2d_{12} = [d\,\cos(\pi/4)\,d\,\sin(\pi/4)\,0]^T \quad (14)$$

if the panel is on the third vertex, the locations are $$^0d_{COM,p} = {}^0R_p{}^p d_{COM,p} + {}^0d_{01} + {}^0R_2{}^7 d_{12} + {}^0R_7 d_{23} \quad (15)$$

where $$^7d_{23} = [2b\,\cos(\pi/4)\,2b\,\sin(\pi/4)\,0]^T \quad (16)$$

and if the panel is on the fourth vertex, the locations are mirrored as follows $$^0d_{COM,p} = R_z(\pi){}^0R_p{}^p d_{COM,p} + {}^0d_{01} + R_z(\pi){}^0R_2{}^2 d_{12} \quad (17)$$

and the mirrored locations of the fifth vertex are $$^0d_{COM,p} = R_z(\pi){}^0R_p{}^p d_{COM,p} + {}^0d_{01} + R_z(\pi){}^0R_2{}^7 d_{12} + R_z(\pi){}^0R_7 d_{23} \quad (18)$$

Similarly, the body-fixed locations of the constraints are listed in the Appendix. For example, the body-fixed location $^p d_{c,p,i}$ of the i th constraint for panel 1 is $$^p d_{c,p,i} = [r_i \cos(\pi/4)\,r_i \sin(\pi/4)\,0]^T \quad (19)$$

where the distance-from-point parameters $r_i$ follow $0 < r_1 \le b/2$ and $b/2 \le r_1 < b$ and are the same for each constrained panel. So the locations of the constraints in the base frame for panel 1 are $$^0d_{c,1,i} = {}^0R_1{}^1 d_{c,1,i} + {}^0d_{01} \quad (20)$$

Then the locations for each constraint for panel p are $$^0d_{c,p,i} = {}^0R_p{}^p d_{c,p,i} + {}^0d_{01} \quad (21)$$

The lengths of the constraint lines can be independent of their base-frame locations as they run from opposite panels in a vertex. So the length of the i th constraint line of the p th panel is $$l_i = 2^p d_{c,p,i} \sin(\phi/2) \quad (22)$$

With the kinematics of the mechanism derived, the relationships between projected area, locations of centers of mass, and constraint line lengths as functions of the fold angle can be considered. The distance values can be normalized by 2b (height of two rows) and the area by the total area of the two rows when fully deployed.

Figure 17:
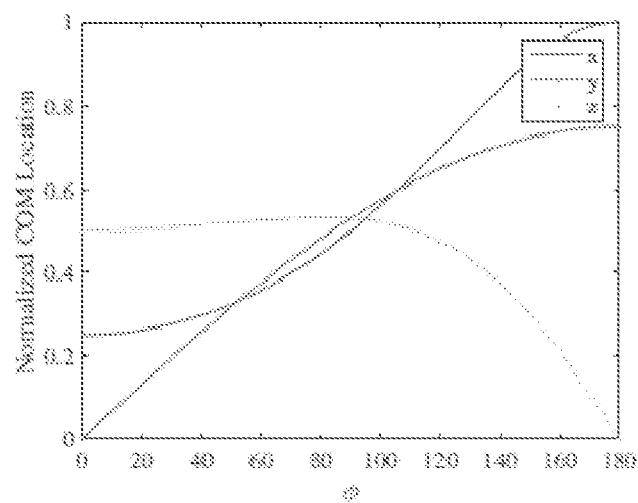
FIG. 17 shows a normalized location of a center of mass for a panel as a function of deployment angle #.

The location of the COM for any panel can be plotted as a function of the deployment angle $\phi$. For example, the location of the COM for panel 3 is shown in FIG. 17.

Figure 18:
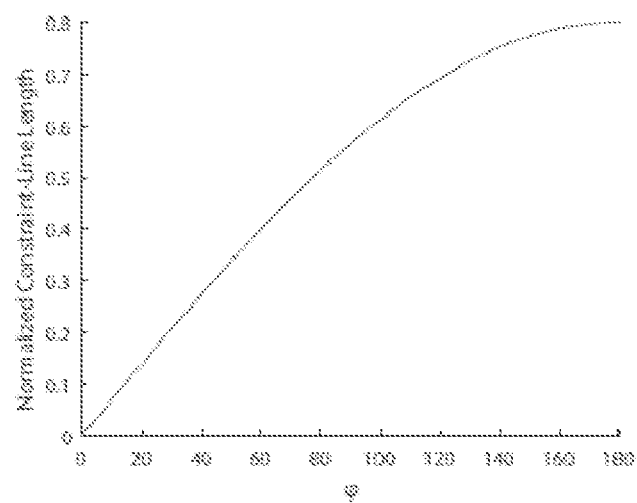
FIG. 18 shows a normalized constraint-line length as a function of deployment angle #.

FIG. 18 shows the constraint-line length as a function of $\phi$. This is useful to a designer to know what the constraint line should be to achieve the desired deployment.

Figure 19:
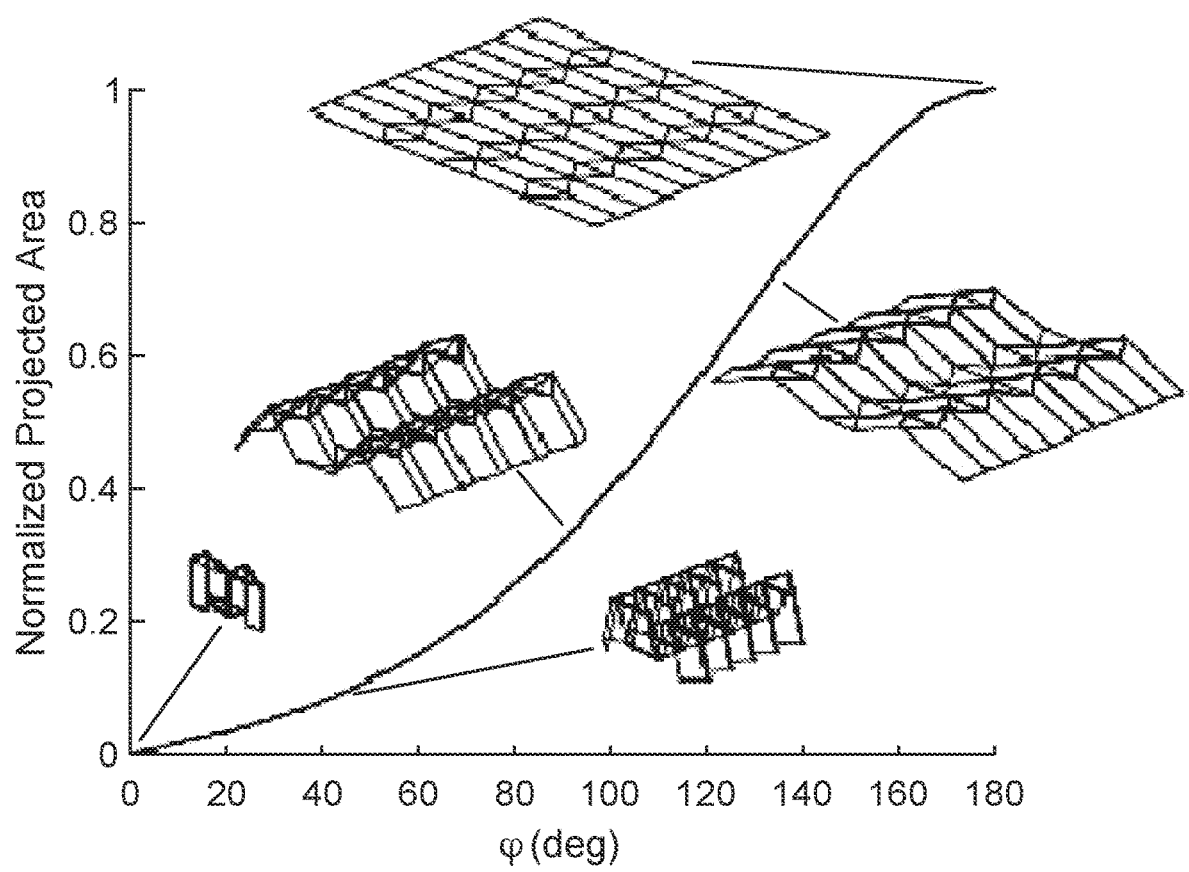

FIG. 19 describes what percentage of the panel area is projected onto the x-y plane and a function of $\phi$. Also shown in FIG. 19 are diagrams of the structure in various deployment angles. It is predicted that to obtain the required stiffness of a deployed space structure, a structure of this nature needs to not fully deploy flat. The normalized projected area is $$A_{proj,norm} = \frac{A_{proj,tot}}{A_{tot}} \quad (23)$$

where $$A_{proj,tot} = \sum_{p=1}^{N_p} A_p^p \hat{k} \cdot {}^0\hat{k} \quad (24)$$

and $A_{tot}$ is the total pattern area, $N_p$ is the number of panels, $A_p$ is the panel area, $^p\hat{k}$ is the panel frame surface normal (z-axis), $^0\hat{k}$ is the x-y plane surface normal (z-axis).

This plot (FIG. 19) suggests that, at the end of the deployment, for a small cost in projected area, the array can be stiffened significantly. For example, the projected area can be reduced by 5% while the deployment can be reduced by 10%. From FIG. 18, we learn that the constraint-line length should be 78% of 2b to constrain the structure at this deployment angle.

The spatial kinematics of the serpentine accordion, were derived. The relationships between locations of centers of mass, the constraint-line lengths, and the projected area were shown. These results can be used to create equations of motion and stiffness models of mechanisms based on this pattern. The models assist design of space structures which will be stiff enough to undergo the expected accelerations from the spacecraft while maintaining enough deployed area to achieve the structure's purpose, such as to generate solar power.

APPENDIX

The locations of the centers of mass for each panel in the first two rows are:

$$^1d_{COM,1} = [c/3 \ c/3 \ 0]^T \tag{25}$$

$$^2d_{COM,2} = [c/2 + d/2 \cos(\pi/4) \ d/2 \sin(\pi/4) \ 0]^T \tag{26}$$

$$^3d_{COM,3} = [d/2 + c/2 \cos(\pi/4) \ c/2 \sin(\pi/4) \ 0]^T \tag{27}$$

$$^4d_{COM,4} = {}^1d_{COM,1} \tag{28}$$

$$^5d_{COM,5} = {}^2d_{COM,2} \tag{29}$$

$$^6d_{COM,6} = {}^3d_{COM,3} \tag{30}$$

$$^7d_{COM,7} = [2c/3 \ c/3 \ 0]^T \tag{31}$$

$$^8d_{COM,8} = [b \ b/3 \ 0]^T \tag{32}$$

$$^9d_{COM,9} = \begin{bmatrix} \dfrac{-\sqrt{2}d^2 + \sqrt{2}bd + bc}{2b + 4d} \\ \dfrac{3\sqrt{2}d^2 + 3\sqrt{2}bd + bc}{6b + 12d} \\ 0 \end{bmatrix} \tag{33}$$

$$^{10}d_{COM,10} = \begin{bmatrix} \dfrac{-3d^2 + bc}{3b + 6d} \\ \dfrac{b(2c + 3d)}{3b + 6d} \\ 0 \end{bmatrix} \tag{34}$$

$$^{11}d_{COM,11} = {}^7d_{COM,7} \tag{35}$$

$$^{12}d_{COM,12} = {}^8d_{COM,8} \tag{36}$$

$$^{12}d_{COM,12} = {}^9d_{COM,9} \tag{37}$$

$$^{14}d_{COM,14} = {}^{10}d_{COM,10} \tag{38}$$

The rotation matrices for each panel:

$$^0R_1 = R_x(\gamma_2/2)R_z(-3\pi/4) \tag{39}$$

$$^0R_2 = {}^0R_1{}^1[R_z(\alpha_1)R_x(\gamma_1)]_2 \tag{40}$$

$$^0R_3 = {}^0R_2{}^2[R_z(\alpha_2)R_x(\gamma_2)]_3 \tag{41}$$

$$^0R_4 = {}^0R_3{}^3[R_z(\alpha_2)R_x(\gamma_1)]_4 \tag{42}$$

$$^0R_5 = {}^0R_4{}^4[R_z(\alpha_1)R_x(\gamma_1)]_5 \tag{43}$$

$$^0R_6 = {}^0R_5{}^5[R_z(\alpha_2)R_x(\gamma_2)]_6 \tag{44}$$

$$^0R_7 = {}^0R_2{}^2[R_x(-\gamma_1)]_7 \tag{45}$$

$$^0R_8 = {}^0R_7{}^7[R_z(\alpha_2)R_x(-\gamma_2)]_8 \tag{46}$$

$$^0R_9 = {}^0R_7{}^7[R_z(-\pi/2)R_x(-\gamma_1)]_9 \tag{47}$$

$$^0R_{10} = {}^0R_9{}^9[R_z(\pi-\alpha_2)R_x(\gamma_2)]_{10} \tag{48}$$

$$R_s = R_z(\pi) \tag{49}$$

$$^0R_{11} = R_M{}^0R_2{}^2[R_x(-\gamma_1)]_7 \tag{50}$$

$$^0R_{12} = {}^0R_{11}{}^{11}[R_z(\alpha_2)R_x(-\gamma_2)]_{12} \tag{51}$$

$$^0R_{13} = {}^0R_{11}{}^{11}[R_z(-\pi/2)R_x(-\gamma_1)]_{13} \tag{52}$$

$$^0R_{14} = {}^0R_{13}{}^{13}[R_z(\pi-\alpha_2)R_x(\gamma_2)]_{14} \tag{53}$$

The locations of the constraints for each constrained panel are:

$$^1d_{c,1,i} = [r_i \cos(\pi/4) \ r_i \sin(\pi/4) \ 0]^T \tag{54}$$

$$^7d_{c,7,i} = [c - r_i \cos(\pi/4) \ r_i \sin(\pi/4) \ 0]^T \tag{55}$$

$$^8d_{c,8,i} = [b \ b - r_i \ 0]^T \tag{56}$$

FIGS. 20-26 are the definitions of the body-fixed frames for each of the panels.

Figure 20:
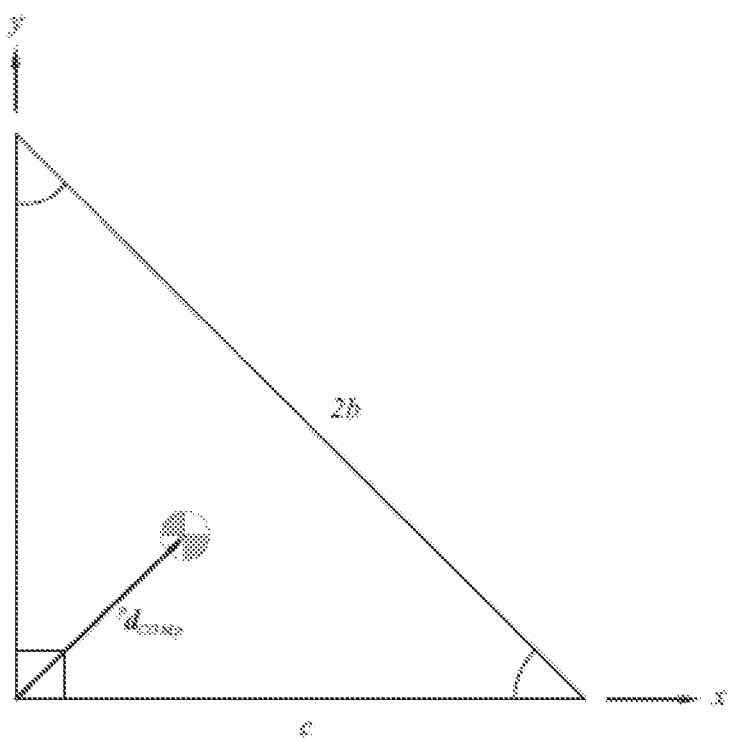
FIGS. 20-26 are definitions of body-fixed frames
Figure 20:
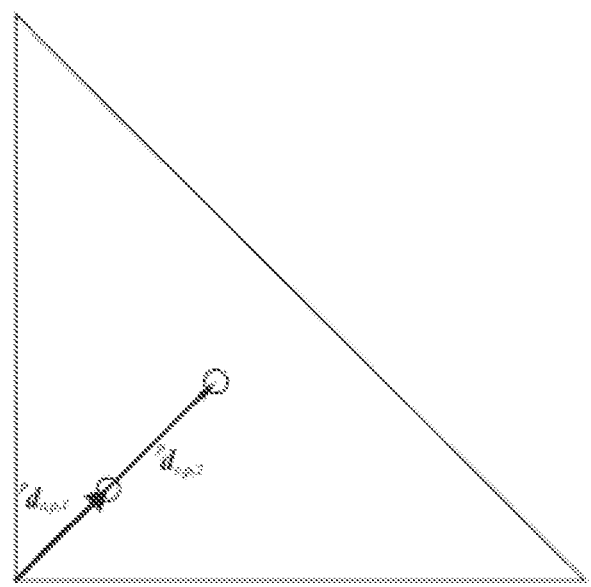

FIG. 20 is the body-fixed frame and panel dimensions for panels 1 and 4.

Figure 21:
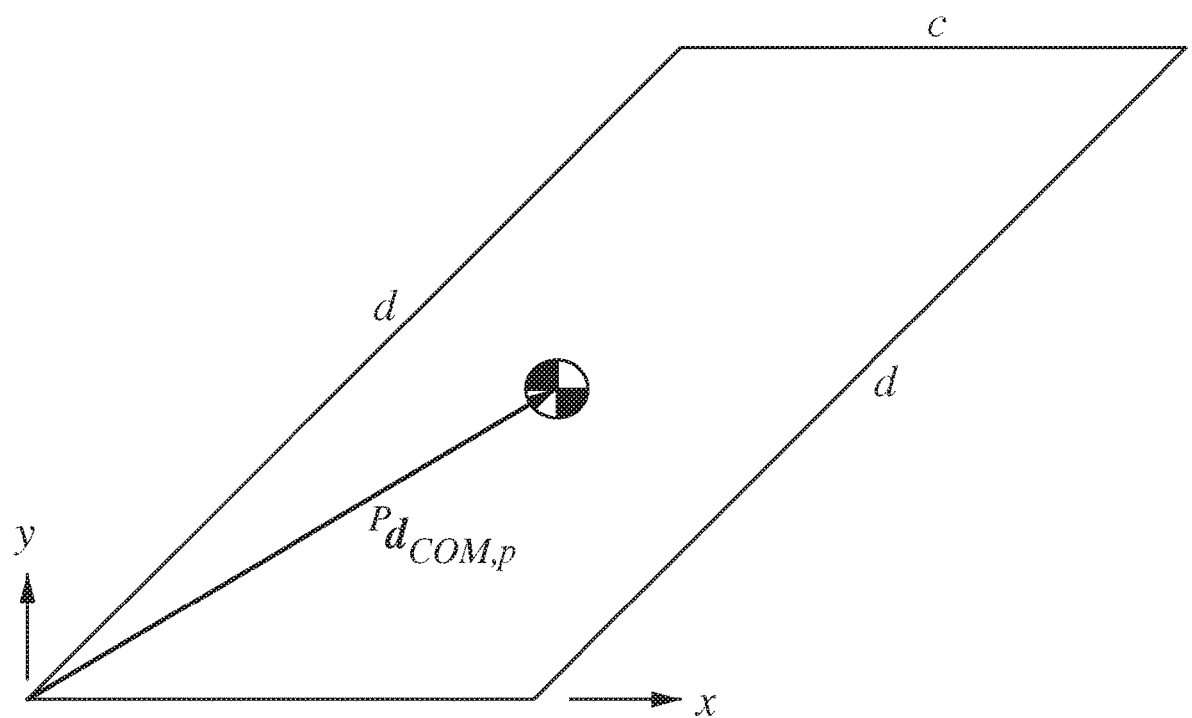

FIG. 21 is the body-fixed frame and panel dimensions for panels 2 and 5.

Figure 22:
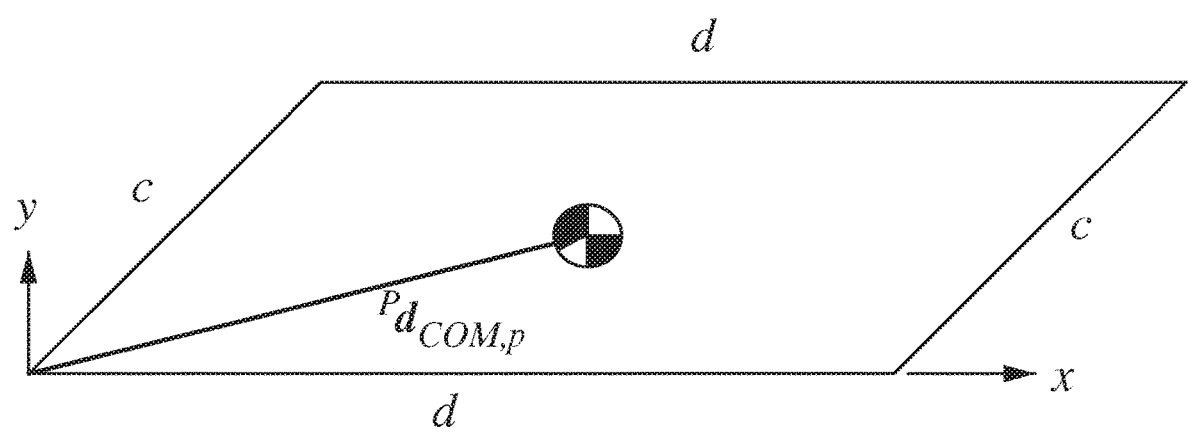

FIG. 22 is the body-fixed frame and panel dimensions for panels 3 and 6.

Figure 23:
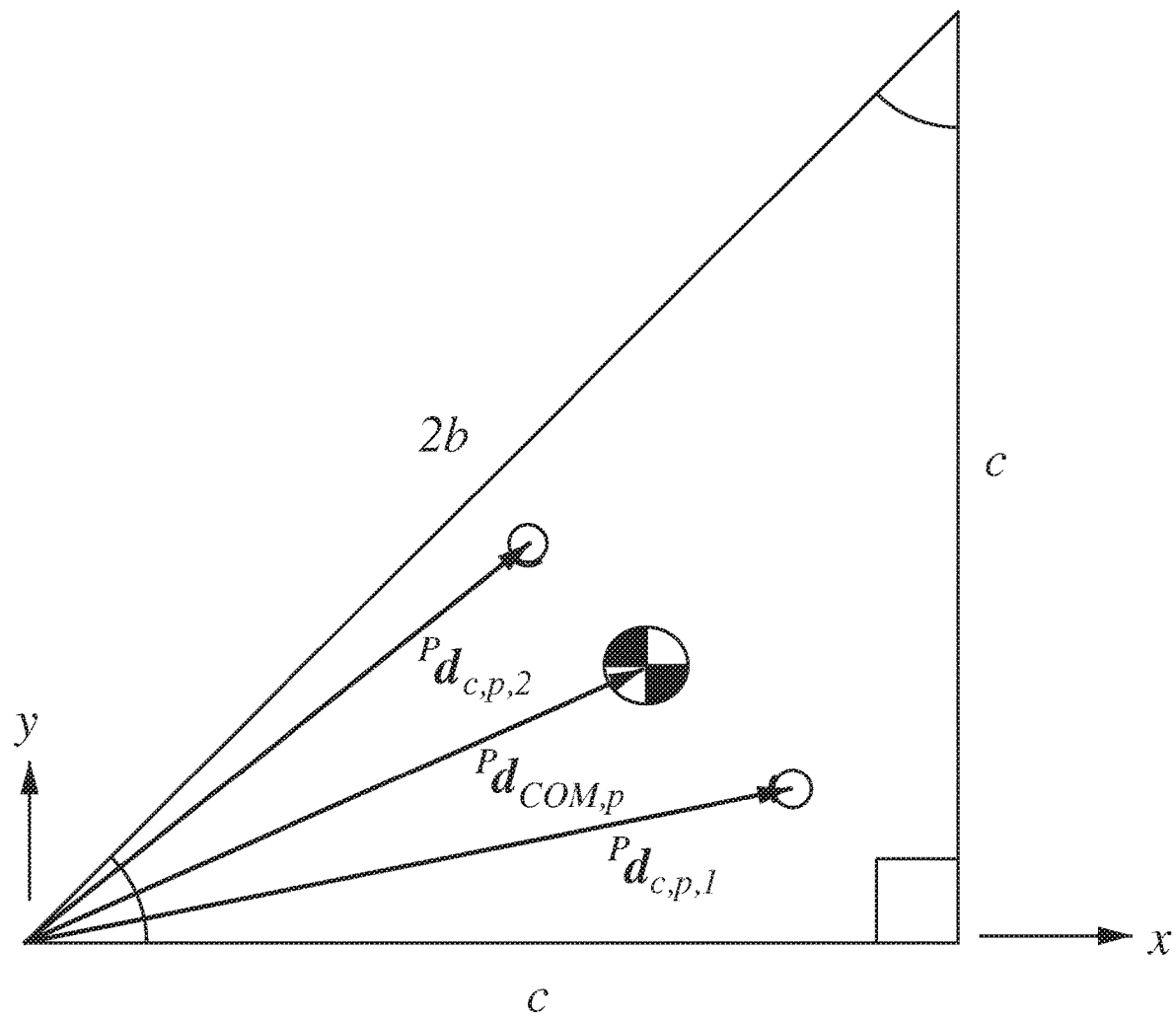

FIG. 23 is the body-fixed frame and panel dimensions for panels 7 and 11.

Figure 24:
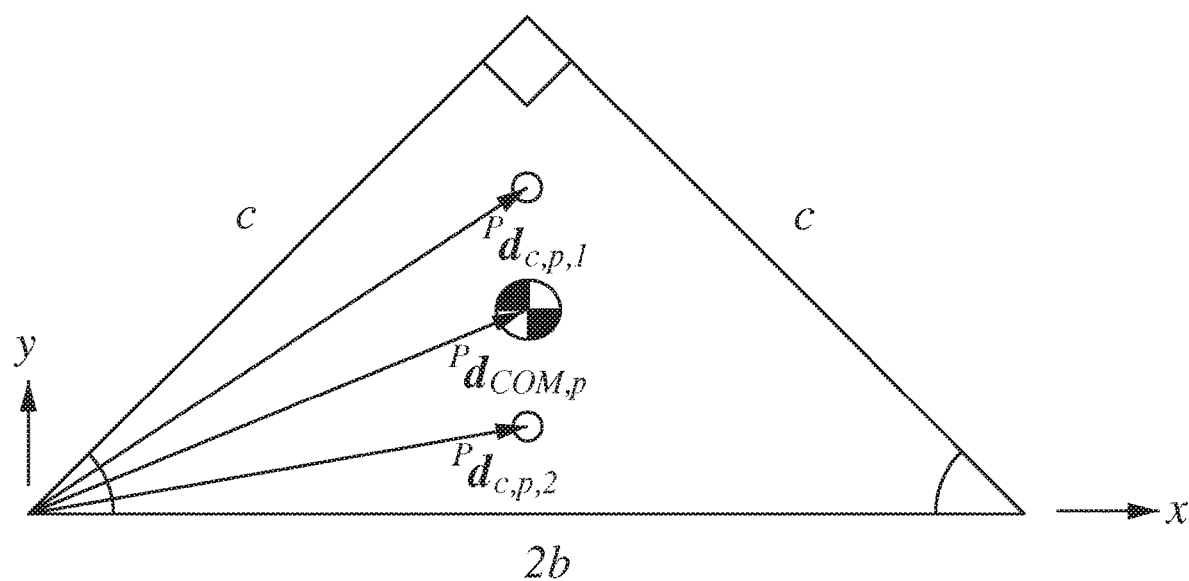

FIG. 24 is the body-fixed frame and panel dimensions for panels 8 and 12.

Figure 25:
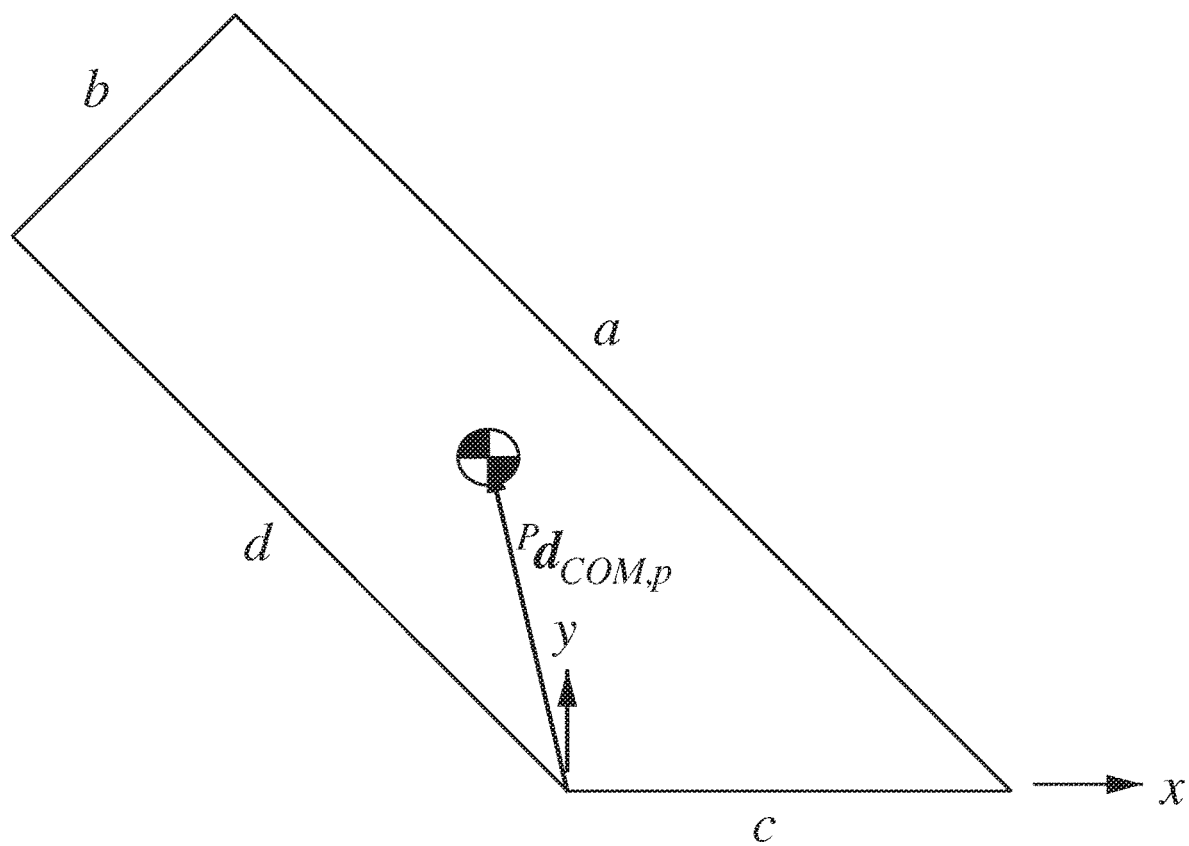

FIG. 25 is the body-fixed frame and panel dimensions for panels 9 and 13.

Figure 26:
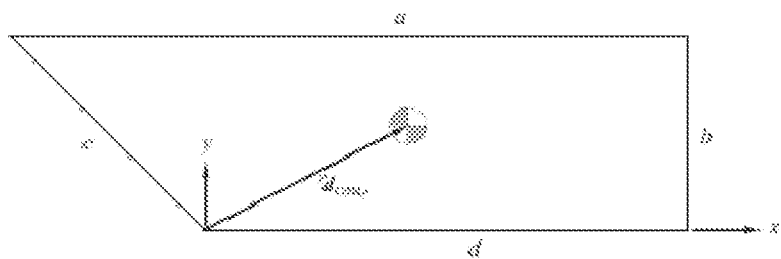

FIG. 26 is the body-fixed frame and panel dimensions for panels 10 and 14.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
    a central member comprising at least a first side, a second side, and a third side;
    a first interior panel, a second interior panel, and a third interior panel rotatably attached, respectively, to the first side, the second side, and third side;
    a first exterior panel, a second exterior panel, and a third exterior panel rotatably attached, respectively, to the first interior panel, the second interior panel, and the third interior panel;
    a first interior biasing member attached to the central member and the first interior panel, the first interior biasing member biasing the first interior panel to extend away from the central member toward a plane parallel to the central member;
    a first interior biasing member attached to the central member and the first interior panel, the first interior biasing member biasing the first interior panel to extend away from the central member toward a plane parallel to the central member;
    a first interior restraint cable attached to the central member and the first interior panel, the first interior restraint cable restraining the first interior panel from extending along the plane parallel to the central member;
    a reeling cable attached to the central member and the first interior panel, the reeling cable controlling an angle of inclination between the first interior panel and the central member and
    a reeling actuator controlling a length of the reeling cable, the reeling actuator being configured to change the angle of inclination between the first interior panel and the central member by changing the length of the reeling cable.

2. The apparatus of claim 1, wherein at least one of the central member, the first interior panel, the second interior panel, the third interior panel, the first exterior panel, the second exterior panel, and the third exterior panel includes a mirror.

3. The apparatus of claim 1, wherein the central member, the first interior panel, the second interior panel, the third interior panel, the first exterior panel, the second exterior panel, and the third exterior panel include at least one of plastic or metal.

4. The apparatus of claim 1, wherein:
    the reeling cable is coupled to the first interior panel, the second interior panel, the third interior panel, the first exterior panel, the second exterior panel, and the third exterior panel; and
    the reeling actuator is configured to change the angle of inclination between the first interior panel and the central member and angles of inclination between the second interior panel and the central member, the third interior panel and the central member, the first exterior panel and the first interior panel, the second exterior panel and the second interior panel, and the third exterior panel and the third interior panel, by changing the length of the reeling cable.

5. The apparatus of claim 4, wherein the reeling actuator is configured to change the length of the reeling cable from a minimum length to a maximum length over a time period of at least half of a second.

6. The apparatus of claim 1, wherein the first interior biasing member comprises a torsion spring.

7. The apparatus of claim 1, wherein the first interior panel, the second interior panel, the third interior panel, the first exterior panel, the second exterior panel, and the third exterior panel each has a thickness of less than five centimeters.

8. The apparatus of claim 1, wherein the first interior panel, the second interior panel, the third interior panel, the first exterior panel, the second exterior panel, and the third exterior panel each has a length of at least one meter.

9. An apparatus comprising:
    a central member comprising at least a first side, a second side, and a third side;
    a first interior panel, a second interior panel, and a third interior panel rotatably attached, respectively, to the first side, the second side, and third side;
    a first exterior panel, a second exterior panel, and a third exterior panel rotatably attached, respectively, to the first interior panel, the second interior panel, and the third interior panel;

a first interior biasing member attached to the central member and the first interior panel, the first interior biasing member biasing the first interior panel to extend away from the central member toward a plane parallel to the central member;

a first interior biasing member attached to the central member and the first interior panel, the first interior biasing member biasing the first interior panel to extend away from the central member toward a plane parallel to the central member;

a first interior restraint cable attached to the central member and the first interior panel, the first interior restraint cable restraining the first interior panel from extending along the plane parallel to the central member; and a reeling cable attached to the central member and the first interior panel, the reeling cable controlling an angle of inclination between the first interior panel and the central member, wherein the apparatus does not include any booms.

10. An apparatus comprising:

a central member comprising at least a first side, a second side, and a third side;

a first interior panel, a second interior panel, and a third interior panel rotatably attached, respectively, to the first side, the second side, and third side;

a first exterior panel, a second exterior panel, and a third exterior panel rotatably attached, respectively, to the first interior panel, the second interior panel, and the third interior panel;

a first interior biasing member attached to the central member and the first interior panel, the first interior biasing member biasing the first interior panel to extend away from the central member toward a plane parallel to the central member;

a first interior biasing member attached to the central member and the first interior panel, the first interior biasing member biasing the first interior panel to extend away from the central member toward a plane parallel to the central member;

a first interior restraint cable attached to the central member and the first interior panel, the first interior restraint cable restraining the first interior panel from extending along the plane parallel to the central member; and a reeling cable attached to the central member and the first interior panel, the reeling cable controlling an angle of inclination between the first interior panel and the central member, wherein the apparatus does not include any trusses.

11. The apparatus of claim 1, wherein at least one of the first interior panel, the second interior panel, the third interior panel, the first exterior panel, the second exterior panel, and the third exterior panel includes a solar panel.

12. The apparatus of claim 1, further comprising antenna array elements attached to the first exterior panel, the second exterior panel, and the third exterior panel.

13. The apparatus of claim 1, further comprising:

a second interior biasing member attached to the central member and the second interior panel, the second interior biasing member biasing the second interior panel to extend away from the central member toward a plane parallel to the central member;

a second interior restraint cable attached to the central member and the second interior panel, the second interior restraint cable restraining the second interior panel from extending along the plane parallel to the central member;

a third interior biasing member attached to the central member and the third interior panel, the third interior biasing member biasing the third interior panel to extend away from the central member toward a plane parallel to the central member;

a third interior restraint cable attached to the central member and the third interior panel, the third interior restraint cable restraining the third interior panel from extending along the plane parallel to the central member;

a first exterior biasing member attached to the first interior panel and the first exterior panel, the first exterior biasing member biasing the first exterior panel to extend away from the first interior panel toward a plane parallel to the first interior panel;

a first exterior restraint cable attached to the first interior panel and the first exterior panel, the first exterior restraint cable restraining the first exterior panel from extending along the plane parallel to the first interior panel;

a second exterior biasing member attached to the second interior panel and the second exterior panel, the second exterior biasing member biasing the second exterior panel to extend away from the second interior panel toward a plane parallel to the second interior panel;

a second exterior restraint cable attached to the second interior panel and the second exterior panel, the second exterior restraint cable restraining the second exterior panel from extending along the plane parallel to the second interior panel;

a third exterior biasing member attached to the third interior panel and the third exterior panel, the third exterior biasing member biasing the third exterior panel to extend away from the third interior panel toward a plane parallel to the third interior panel; and a third exterior restraint cable attached to the third interior panel and the third exterior panel, the third exterior restraint cable restraining the third exterior panel from extending along the plane parallel to the third interior panel.

14. The apparatus of claim 13, wherein:

the central member includes the first side, the second side, the third side, a fourth side, and a fifth side; and the apparatus further comprises:

a fourth interior panel rotatably attached to the fourth side;

a fourth interior biasing member attached to the central member and the fourth interior panel, the fourth interior biasing member biasing the fourth interior panel to extend away from the central member toward a plane parallel to the central member;

a fourth interior restraint cable attached to the central member and the fourth interior panel, the fourth interior restraint cable restraining the fourth interior panel from extending along the plane parallel to the central member;

a fifth interior panel rotatably attached to the fifth side;

a fifth interior biasing member attached to the central member and the fifth interior panel, the fifth interior biasing member biasing the fifth interior panel to extend away from the central member toward a plane parallel to the central member;

a fifth interior restraint cable attached to the central member and the fifth interior panel, the fifth interior restraint cable restraining the fifth interior panel from extending along the plane parallel to the central member;

a fourth exterior panel rotatably attached to the fourth interior panel;

a fourth exterior biasing member attached to the fourth interior panel and the fourth exterior panel, the fourth exterior biasing member biasing the fourth exterior panel to extend away from the fourth interior panel toward a plane parallel to the fourth interior panel;

a fourth exterior restraint cable attached to the fourth interior panel and the fourth exterior panel, the fourth exterior restraint cable restraining the fourth exterior panel from extending along the plane parallel to the fourth interior panel;

a fifth exterior panel rotatably attached to the fifth interior panel;

a fifth exterior biasing member attached to the fifth interior panel and the fifth exterior panel, the fifth exterior biasing member biasing the fifth exterior panel to extend away from the fifth interior panel toward a plane parallel to the fifth interior panel; and a fifth exterior restraint cable attached to the fifth interior panel and the fifth exterior panel, the fifth exterior restraint cable restraining the fifth exterior panel from extending along the plane parallel to the fifth interior panel.

15. The apparatus of claim 9, wherein at least one of the central member, the first interior panel, the second interior panel, the third interior panel, the first exterior panel, the second exterior panel, and the third exterior panel includes a mirror.

16. The apparatus of claim 9, wherein:
the reeling cable is coupled to the first interior panel, the second interior panel, the third interior panel, the first exterior panel, the second exterior panel, and the third exterior panel; and the apparatus further comprises a reeling actuator controlling a length of the reeling cable, the reeling actuator being configured to change the angle of inclination between the first interior panel and the central member and angles of inclination between the second interior panel and the central member, the third interior panel and the central member, the first exterior panel and the first interior panel, the second exterior panel and the second interior panel, and the third exterior panel and the third interior panel, by changing the length of the reeling cable.

17. The apparatus of claim 16, wherein the reeling actuator is configured to change the length of the reeling cable from a minimum length to a maximum length over a time period of at least half of a second.

18. The apparatus of claim 10, wherein at least one of the central member, the first interior panel, the second interior panel, the third interior panel, the first exterior panel, the second exterior panel, and the third exterior panel includes a mirror.

19. The apparatus of claim 10, wherein:
the reeling cable is coupled to the first interior panel, the second interior panel, the third interior panel, the first exterior panel, the second exterior panel, and the third exterior panel; and the apparatus further comprises a reeling actuator controlling a length of the reeling cable, the reeling actuator being configured to change the angle of inclination between the first interior panel and the central member and angles of inclination between the second interior panel and the central member, the third interior panel and the central member, the first exterior panel and the first interior panel, the second exterior panel and the second interior panel, and the third exterior panel and the third interior panel, by changing the length of the reeling cable.

20. The apparatus of claim 19, wherein the reeling actuator is configured to change the length of the reeling cable from a minimum length to a maximum length over a time period of at least half of a second.

* * * * *

UNITED STATES PATENT AND TRADEMARK OFFICE
CERTIFICATE OF CORRECTION

| | |
|---|---|
| PATENT NO. | : 11,533,018 B2 |
| APPLICATION NO. | : 17/250134 |
| DATED | : December 20, 2022 |
| INVENTOR(S) | : Magleby et al. |

It is certified that error appears in the above-identified patent and that said Letters Patent is hereby corrected as shown below:

In the Claims

In Column 20, Claim 1, Line 12, delete "member" and insert -- member; --, therefor.

Signed and Sealed this
Fifteenth Day of August, 2023

Katherine Kelly Vidal
*Director of the United States Patent and Trademark Office*